(12) United States Patent
Kurumaya

(10) Patent No.: US 11,831,848 B2
(45) Date of Patent: Nov. 28, 2023

(54) INFORMATION PROCESSING APPARATUS, COLOR MANAGEMENT METHOD AND NON-TRANSITORY COMPUTER-READABLE RECORDING MEDIUM ENCODED WITH COLOR MANAGEMENT PROGRAM

(71) Applicant: Konica Minolta, Inc., Tokyo (JP)

(72) Inventor: Haruka Kurumaya, Niiza (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/834,362

(22) Filed: Jun. 7, 2022

(65) Prior Publication Data
US 2022/0400189 A1 Dec. 15, 2022

(30) Foreign Application Priority Data
Jun. 9, 2021 (JP) ................................ 2021-096363

(51) Int. Cl.
*H04N 1/60* (2006.01)
(52) U.S. Cl.
CPC ......... *H04N 1/6033* (2013.01); *H04N 1/6008* (2013.01)
(58) Field of Classification Search
CPC ..... H04N 1/6033; H04N 1/6008; H04N 1/603
See application file for complete search history.

(56) References Cited

U.S. PATENT DOCUMENTS

| 6,519,050 | B1 * | 2/2003 | Eintracht | H04N 1/62 358/1.9 |
| 8,773,715 | B2 * | 7/2014 | Katayama | G01J 3/52 358/1.9 |
| 10,992,841 | B2 * | 4/2021 | Toriyabe | H04N 1/6008 |
| 2006/0126106 | A1 * | 6/2006 | Harrington | H04N 1/00015 358/1.15 |
| 2011/0075172 | A1 * | 3/2011 | Katayama | H04N 1/6033 358/1.9 |
| 2011/0176157 | A1 * | 7/2011 | Katayama | H04N 1/6033 358/1.9 |
| 2017/0078496 | A1 * | 3/2017 | Sugimoto | G06F 3/1256 |
| 2018/0063376 | A1 * | 3/2018 | Ohara | H04N 1/00482 |

(Continued)

FOREIGN PATENT DOCUMENTS

JP 2019146038 8/2019
JP 2019146038 A * 8/2019 .......... H04N 1/6008

(Continued)

*Primary Examiner* — Ted W Barnes
(74) *Attorney, Agent, or Firm* — BakerHostetler

(57) ABSTRACT

An information processing apparatus, accessible to a color expert who manages colors of an image to be printed in a plurality of printing devices and a plurality of operators each of whom is capable of operating at least the one printing device out of the plurality of printing device, registers a patch image to be printed by any of the plurality of printing devices and/or a color management setting information piece defining a condition for printing by the printing device in accordance with an instruction provided by the color expert, sets the patch image and/or the color management setting information piece accessible to the one or more operators, and in response to a request from any of the plurality of operators, permits access to the patch image and/or the color management setting information piece set accessible to the operator who has made the request.

13 Claims, 21 Drawing Sheets

(56) References Cited

U.S. PATENT DOCUMENTS

| | | | | |
|---|---|---|---|---|
| 2019/0095147 A1* | 3/2019 | Yano | .................... | H04N 1/6044 |
| 2019/0260910 A1* | 8/2019 | Maeda | ................. | H04N 1/6052 |
| 2019/0260911 A1* | 8/2019 | Toriyabe | ............. | H04N 1/6008 |
| 2020/0183627 A1* | 6/2020 | Toriyabe | ............ | G03G 15/5087 |
| 2022/0360672 A1* | 11/2022 | Meireson | ............ | B41F 33/0036 |
| 2022/0400189 A1* | 12/2022 | Kurumaya | ........... | H04N 1/6008 |

FOREIGN PATENT DOCUMENTS

| | | | |
|---|---|---|---|
| JP | 2019146040 | | 8/2019 |
| JP | 2019146040 A | * | 8/2019 |

* cited by examiner

FIG. 4

ASSOCIATION RECORD

| COLOR MANAGEMENT IDENTIFICATION INFORMATION | PATCH IMAGE |
|---|---|

FIG. 5

TRACKING INFORMATION RECORD

| TRACKING INFORMATION | COLOR MANAGEMENT SETTING INFORMATION | PRINTING DEVICE |
|---|---|---|

FIG. 6

PATCH IMAGE SHARING RECORD

| PATCH IMAGE | COLOR EXPERT | OPERATOR A | OPERATOR B | OPERATOR C |
|---|---|---|---|---|

FIG. 7

COLOR MANAGEMENT SETTING INFORMATION SHARING RECORD

| COLOR MANAGEMENT SETTING INFORMATION | COLOR EXPERT | OPERATOR A | OPERATOR B | OPERATOR C |
|---|---|---|---|---|

FIG. 8

TRACKING INFORMATION SHARING RECORD

| TRACKING INFORMATION | COLOR EXPERT | OPERATOR A | OPERATOR B | OPERATOR C |
|---|---|---|---|---|

FIG. 9

COLORIMETRIC RESULT ASSOCIATION RECORD

| TRACKING INFORMATION | PATCH IMAGE | COLORIMETRIC DATA |
|---|---|---|

FIG. 14

■ SETTING

TRACKING NAME :
[TR name ▽]

TARGET CONFIGURATION
[TC name ▽]

☑ USAGE OF QUALITY OPTIMIZER FUNCTION :

TRACKING INFORMATION CREATION

SECTION :
[Tokyo ▽]

PRINTER NAME :
[PRINTER 1 ▽]

PRINTER MODEL :
[⋯]

PRINTER SERIAL NUMBER :
[⋯]

[CANCEL]

| | | CUSTOM WEDGE | | | |
|---|---|---|---|---|---|
| + CREATE | 📥 IMPORT | 📤 EDIT | ⟨⋯⟩ SHARE | 🗑 DELETE | |
| SHARING | IN USE | CUSTOM WEDGE NAME | OWNER COMPANY | CREATION/IMPORT DATA AND TIME | COMMENTS |
| ☑ | | CustomWedge_CVT | KM Inc | 2019-09-16 13:59:19 | EDIT |
| ☐ | 🔒 | CVT_Ref_sim2 | KM Inc | 2019-09-16 11:40:56 | |
| ☐ ⟨⋯⟩ | 🔒 | CVT_JMPA2018ColorStrip | KM Inc | 2019-06-27 15:19:04 | |
| ☐ ⟨⋯⟩ | 🔒 | CVT_JMPA2018_EC12002_ver5 | KM Inc | 2019-06-27 13:45:01 | |
| ☐ ⟨⋯⟩ | 🔒 | CVT_JapanColor2011 | KM Inc | 2019-06-27 12:52:41 | |
| ☐ | 🔒 | CVT_IDEAlliance2013 | KM Inc | 2019-06-27 12:02:02 | |
| ☐ | 🔒 | CVT_J17Patces_ver4 | KM Inc | 2019-06-27 11:54:24 | |
| ☐ | 🔒 | CVT_IDEAlliance2009_ver2 | KM Inc | 2019-06-27 11:47:46 | |

◉ DASHBOARD  🖼 IMAGE

FIG. 18

```
APPLICATION TO LINK DESTINATION COMPANY              ☒
┌────────────────────────────────────────────────────┐
│ PLEASE INPUT E-MAIL ADDRESS OF A COMPANY           │
│ WHICH YOU WANT TO APPLY.                           │
│                                                    │
│   E-Mail Address      [ Operator01@abcd.com ]      │
│                                                    │
│   E-Mail Address      [ Operator01@abcd.com ]      │
│    (CONFIRM)                                       │
│                                                    │
│                         [  OK  ]    [ CANCEL ]     │
└────────────────────────────────────────────────────┘
```

FIG. 19

```
COMPANY LINK KEY ACCEPTANCE                          ☒
┌────────────────────────────────────────────────────┐
│ INPUT COMPANY LINK KEY AND PRESS "NEXT."           │
│ NAME OF LINK DESTINATION COMPANY WILL BE DISPLAYED.│
│                                                    │
│ COMPANY LINK KEY : [ C1519-1E-63-16-9A ]           │
│                                                    │
│                         [ NEXT ]    [ CANCEL ]     │
└────────────────────────────────────────────────────┘
```

FIG. 20

```
SHARING ACCEPTANCE                                   ☒
┌────────────────────────────────────────────────────┐
│ FOLLOWING COMPANY IS REQUESTING TO LINK WITH YOU.  │
│ DO YOU WANT TO ACCEPT REQUEST?                     │
│                                                    │
│ CUSTOM WEDGE NAME : CustomWedge_CVT                │
│                                                    │
│ COMPANY LINK KEY  : C1519-1E-63-16-9A              │
│                                                    │
│ SHARING SOURCE    : KM Inc                         │
│                                                    │
│                      [ ACCEPTANCE ]  [ CANCEL ]    │
└────────────────────────────────────────────────────┘
```

FIG. 21

| | | CUSTOM WEDGE | | | |
|---|---|---|---|---|---|
| ⊙ DASHBOARD | | | | | |
| 🖼 IMAGE | | + CREATE | 📥 IMPORT | 🗑 EDIT | ⟨⋯⟩ SHARE | 🗑 DELETE |

| | SHARING | IN USE | CUSTOM WEDGE NAME | OWNER COMPANY | CREATION/IMPORT DATA AND TIME | COMMENTS |
|---|---|---|---|---|---|---|
| ☑ | ⟨⋯⟩ | 🔒 | CustomWedge_CVT | KM Inc | 2019-09-16 13:59:19 | EDIT |
| ☐ | ⟨⋯⟩ | 🔒 | CVT_Ref_sim2 | KM Inc | 2019-09-16 11:40:56 | |
| ☐ | ⟨⋯⟩ | 🔒 | CVT_JMPA2018ColorStrip | KM Inc | 2019-06-27 15:19:04 | |
| ☐ | ⟨⋯⟩ | 🔒 | CVT_JMPA2018_ECI2002_ver5 | KM Inc | 2019-06-27 13:45:01 | |
| ☐ | ⟨⋯⟩ | 🔒 | CVT_JapanColor2011 | KM Inc | 2019-06-27 12:52:41 | |
| ☐ | ⟨⋯⟩ | 🔒 | CVT_IDEAlliance2013 | KM Inc | 2019-06-27 12:02:02 | |
| ☐ | ⟨⋯⟩ | 🔒 | CVT_J17Patces_ver4 | KM Inc | 2019-06-27 11:54:24 | |
| ☐ | ⟨⋯⟩ | 🔒 | CVT_IDEAlliance2009_ver2 | KM Inc | 2019-06-27 11:47:46 | |

F I G. 2 7

TARGET CONFIGURATION CREATION

■ TARGET CONFIGURATION

■ BASIC SETTING
WEDGE SELECTION : [Fogra v3 ▽]
TARGET PROFILE : [ISOcoated v2 ed ▽]

■ COLORIMETRIC CONDITIONS
COLORIMETER SELECTION : [Eye-One i0 ▽]
ILLUMINATION CONDITION : [ISO 13655 M0 ▽]
PROFILING CHART : [ECI2002 CMYK i1 i0(A4) ▽]
COLORIMETRIC COUNT [1 ◇]

■ ALLOWABLE VALUE
☑ USAGE OF STANDARD ALLOWABLE VALUE :
[ISO 12647-7:2016color bar ▽]
substrate :
level :
Delta E Formula :

Delta E Paper :
Delta E Average :
Delta E Maximum :
Delta E Max. Primaries :
Delta E Max. CMY :
Delta Ch ΦCMY Gray:
Delta Ch Max. CMY Gray:

■ DEVICE LINK SETTING
PURPOSE OF CMYK RENDERING : [RELATIVE COLOR MEASUREMENT ▽]
RGB SOURCE PROFILE : [eciRGB_v2.icc ▽]
PURPOSE OF RGB RENDERING : [PERCEPTION (IMAGE) ▽]
☑ Preserve Mid-Tone Black
☑ Preserve Solid Black
☑ Use profile with ColoeCentro
MAXIMUM INK AMOUNT[%] : [400 ◇]

[OK]  [CANCEL]

INFORMATION PROCESSING APPARATUS, COLOR MANAGEMENT METHOD AND NON-TRANSITORY COMPUTER-READABLE RECORDING MEDIUM ENCODED WITH COLOR MANAGEMENT PROGRAM

The present application claims priority to Japanese patent Application No. 2021-096363 filed on Jun. 9, 2021, the entire disclosure of which is incorporated herein in its entirety.

BACKGROUND

Technological Field

The present invention relates to an information processing apparatus, a color management method and a non-transitory computer-readable recording medium encoded with a color management program. In particular, the present invention relates to an information processing apparatus that manages the colors of an image printed by each of a plurality of printing devices, a color management method executed by the information processing apparatus and a non-transitory computer-readable recording medium encoded with a color management program that causes a computer to execute the color management method.

Description of the Related Art

Commercial printing devices are required to print in colors requested by customers. An image printed by a printing device varies due to various conditions such as a state of components constituting the printing device, the type of ink used for printing and the type of a recording medium on which an image is to be printed. Therefore, it is necessary to set the printing device such that the printing device can print in colors requested by a customer. The setting of the printing device is usually performed by a person having expertise called a color expert.

However, in a case in which one color expert manages a plurality of printing devices, a load on the color expert increases. Therefore, a system that reduces a load on a color expert because an operator who operates a printing device performs part of work of the color expert has been suggested. For example, Japanese Patent Laid-Open No. 2019-146038 describes a color management system having an information processing apparatus that manages each of a plurality of printing sites including at least one printing device and managing colors of an image printed by a printing device at each printing site, the information processing apparatus notifying the printing device when accepting a change of a setting in regard to a color management setting, the printing device comprising a printing means for printing a chart image in accordance with the color management setting, a colorimetric means for measuring colors of an image printed by the printing means, an instruction means for acquiring a difference between a colorimetric result provided by the colorimetric means and a target value in accordance with the color management setting, determining whether a colorimetric result of a chart image printed by the printing means satisfies a preset determination criterion and providing an instruction for executing a color adjustment process in a case in which the colorimetric result does not satisfy the determination criterion, a first determination means for determining whether a change of setting of the color management setting includes a change in regard to a first setting, a second determination means for determining whether it is possible to print in accordance with the change of setting when the first determination means determines that the change of setting of the color management setting includes a change in regard to the first setting, and a warning means for providing a warning when the second determination means determines that it is not possible to print.

In the color management system described in Japanese Patent Laid-Open No. 2019-146038, because the printing device is notified of the color management setting generated by the color expert, an instruction can be simply provided to an operator by the color expert. However, the work to be performed by the color expert is not limited to this, and there are other processes such as management of information in regard to the color management setting in particular. It is further desired to reduce a load on the color expert.

SUMMARY

According to one aspect of the present invention, an information processing apparatus accessible to a color expert who manages colors of an image to be printed in a plurality of printing devices and a plurality of operators each of whom is capable of operating at least the one printing device out of the plurality of printing device, includes a hardware processor, and the hardware processor registers a patch image to be printed by any of the plurality of printing devices and/or a color management setting information piece defining a condition for printing by the printing device in accordance with an instruction provided by the color expert, sets the patch image and/or the color management setting information piece accessible to the one or more operators, and in response to a request from any of the plurality of operators, permits access to the patch image and/or the color management setting information piece set accessible to the operator who has made the request.

According to another aspect of the present invention, a color management method performed in an information processing apparatus accessible to a color expert who manages colors of an image to be printed in a plurality of printing devices and a plurality of operators each of whom is capable of operating at least the one printing device out of the plurality of printing device, includes a registering step of registering a patch image to be printed by any of the plurality of printing devices and/or a color management setting information piece defining a condition for printing by the printing device in accordance with an instruction provided by the color expert, a sharing setting step of setting the patch image and/or the color management setting information piece accessible to the one or more operators, and an access controlling step of, in response to a request from any of the plurality of operators, permitting access to the patch image and/or the color management setting information piece set accessible to the operator who has made the request.

According to yet another aspect of the present invention, a non-transitory computer-readable recording medium is encoded with a color management program executed by a computer that controls an information processing apparatus accessible to a color expert who manages colors of an image to be printed in a plurality of printing devices and a plurality of operators each of whom is capable of operating at least the one printing device out of the plurality of printing device, and causes the computer to perform a registering step of registering a patch image to be printed by any of the plurality of printing devices and/or a color management setting information piece defining a condition for printing by the printing device in accordance with an instruction provided by the color expert, a sharing setting step of setting the patch image and/or the color management setting information piece accessible to the one or more operators, and an access controlling step of, in response to a request from any of the plurality of operators, permitting access to the patch image and/or the color management setting information piece set accessible to the operator who has made the request.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4 is a diagram showing one example of the format of an association record;

FIG. 5 is a diagram showing one example of the format of a tracking information record;

FIG. 6 is a diagram showing one example of the format of a patch image sharing record;

FIG. 7 is a diagram showing one example of the format of a color management sharing record;

FIG. 8 is a diagram showing one example of the format of a tracking information sharing record;

FIG. 9 is a diagram showing one example of the format of a colorimetric result association record;

FIG. 14 is a diagram showing one example of a tracking information generation screen;

FIG. 16 is a first diagram showing one example of a patch image list screen;

FIG. 18 is a diagram showing one example of a sharing application screen;

FIG. 19 is a diagram showing one example of a link key acceptance screen;

FIG. 20 is a diagram showing one example of a sharing acceptance screen;

FIG. 21 is a second diagram showing one example of a patch image list screen;

FIG. 27 is a diagram showing one example of a colorimetric instruction screen;

DETAILED DESCRIPTION OF EMBODIMENTS

Figure 1:
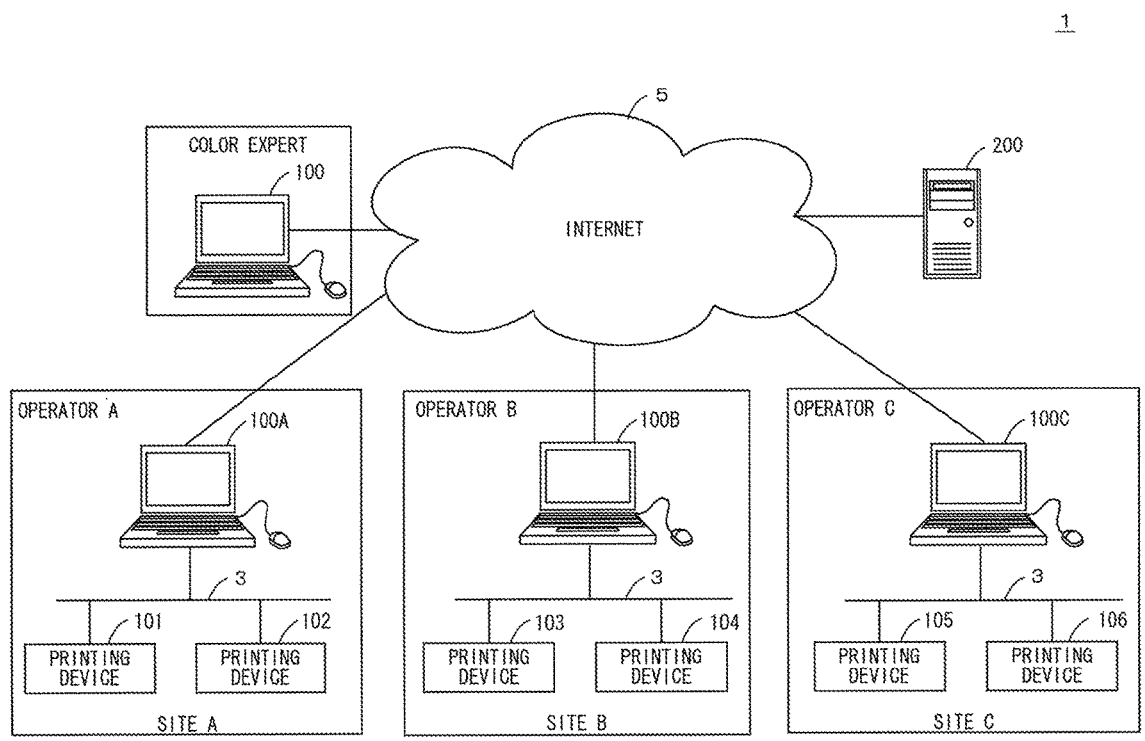
FIG. 1 is a diagram showing one example of the overview of a color management system in the present embodiment.

Hereinafter, one or more embodiments of the present invention will be described with reference to the drawings. However, the scope of the invention is not limited to the disclosed embodiments.

A color management system according to embodiments of the present invention will be described below with reference to the drawings. In the following description, the same parts are denoted with the same reference characters. Their names and functions are also the same. Thus, a detailed description thereof will not be repeated.

FIG. 1 is a diagram showing one example of the overview of the color management system in the present embodiment. The color management system 1 includes a color management server 200, terminal devices 100, 100A to 100C and printing devices 101 to 106. The color management server 200 is a general computer and functions as an information processing apparatus. Each of the terminal devices 100, 100A to 100C is a general computer. Each of the printing devices 101 to 106 is an image forming apparatus such as an inkjet printer or a printer that forms an image by an electrophotographic method. Each of the printing devices 101 to 106 includes a colorimeter. Each of the printing devices 101 to 106 measures a recording medium on which an image is printed with a colorimeter and outputs colorimetric data representing the color of the image formed on the recording medium.

The color management server 200 and the terminal devices 100, 100A to 100C are respectively connected to a network 5 and can communicate with one another. The color management server 200 and the terminal devices 100, 100A to 100C constitute a server-client system. The color management server 200 functions as a server, and the terminal devices 100, 100A to 100C respectively function as clients. The network 5 is the Internet. The network 5 is not limited to the Internet, and may be a Wide Area Network (WAN), a Public Switched Telephone Network (PSTN), a local area network or the like. The connections of the color management server 200 and the terminal devices 100, 100A to 100C to the network 5 may be either wired or wireless.

The terminal device 100A and the two printing devices 101, 102 are arranged at a site A. The terminal device 100A and the two printing devices 101, 102 are connected to the network 5 such as a local area network (LAN) 3, and each of the two printing devices 101, 102 can be controlled from the terminal device 100A.

The terminal device 100B and the two printing devices 103, 104 are arranged at a site B different from the site A. The terminal device 100B and the two printing devices 103, 104 are connected to the LAN3, and each of the two printing devices 103, 104 can be controlled from the terminal device 100B.

The terminal device 100C and the two printing devices 105, 106 are arranged at a site C different from the site A and the site. The terminal device 100C and the two printing devices 105, 106 are connected to the LAN3, and each of the two printing devices 105, 106 can be controlled from the terminal device 100C.

The location where the terminal device 100 used by a color expert is arranged may be any location, may be a location different from the site A, the site B and the site C, or may be any one of the site A, the site B and the site C.

In the present embodiment, a color expert uses the terminal device 100, an operator A working at the site A uses the terminal device 100A, an operator B working at the site B uses the terminal device 100B, and an operator C working at the site C uses the terminal device 100C, by way of example. The color expert has expertise for managing colors of images formed by the printing devices 101 to 106 and manages colors of images formed by the printing devices 101 to 106.

The operator A is a user who is given a right to use each of the printing devices 101, 102, and can operate the terminal device 100A to control each of the printing devices 101, 102. The operator B is a user who is given a right to use each of the printing devices 103, 104 and can operate the terminal device 110B to control each of the printing devices 103, 104. The operator C is a user who is given a right to use each of the printing devices 105, 106 and can operate the terminal device 110C to control each of the printing devices 105, 106. Each of the operator A, the operator B and the operator C performs color adjustment work of adjusting the colors of images formed by a printing device, which each operator is in charge of, out of the printing devices 101 to 106 in accordance with an instruction provided by the color expert. The color adjustment work includes work of setting profile information, a process of attaching a toner or ink tank and a process of placing a recording medium on which an image is to be formed.

A flow of the basic process of color management will now be described.

<First Step>

A color expert determines a printing device, a target configuration and a patch image based on a print request received from a customer. A target configuration is also referred to as color management setting information and includes profile information and colorimetric conditions. The profile information includes a color conversion table. For example, the color conversion table includes a first color conversion table in which color data represented by the RGB color space and color data represented by the L*a*b color space are associated with each other, and a second color conversion table in which color data represented by the L*a*b color space and color data represented by the CMYK color space are associated with each other. A colorimetric condition is a condition for measuring the color of a patch image printed by a printing device, and includes a colorimeter and an illuminating condition, for example.

A patch image is also referred to as a custom wedge and is an image represented by a plurality of types of colors. For example, a patch image includes a plurality of rectangular areas and is an image in which a plurality of types of colors are respectively assigned to the plurality of areas. A color expert determines a patch image including the color represented in an image intended for printing. A color expert determines a patch image by determining patch image data. Patch image data may be image data generated and stored in the past by a color expert or may be image data newly generated by a color expert.

A color expert designates a target configuration, a patch image and a printing device, and requests an operator in charge of operating the printing device to perform adjustment work. Information associating a target configuration with a printing device is referred to as tracking information. Here, the color expert designates the printing device 101 and requests the operator A to perform adjustment work, by way of example.

<Second Step>

The operator A operates the printing device 101 based on an instruction provided by the color expert and causes the printing device 101 to print the patch image and measure the colors of the printed patch image. The operator A may operate the terminal device 100A to cause the printing device 101 to print and measure the colors. Specifically, the operator A operates the terminal device 100A to control the printing device 101 designated by the color expert. The operator A sets the profile information defined by the target configuration for the printing device 101 and causes the printing device 101 to print the patch image defined by the target configuration under a printing condition. The printing device 101 measures the colors of the patch image printed on a recording medium and outputs a colorimetric result.

<Third Step>

The color expert compares the colorimetric result output by the printing device 101 with the patch image and makes an adjustment. For example, the patch image and the colorimetric result are compared to each other, and the profile information and/or the colorimetric condition is changed such that the difference between the two is in a predetermined range.

The color management system 1 according to the present embodiment supports the expert in order to manage the colors of images printed by the printing devices 101 to 106. In the present embodiment, a color management process is executed in the color management server 200. When the color expert operates the terminal device 100 and logs into the color management server 200, a service is provided by the color management server 200. When the operators A to C respectively operate the terminal devices 100A to 100C and log into the color management server 20, a service is provided by the color management server 200.

Figure 2:
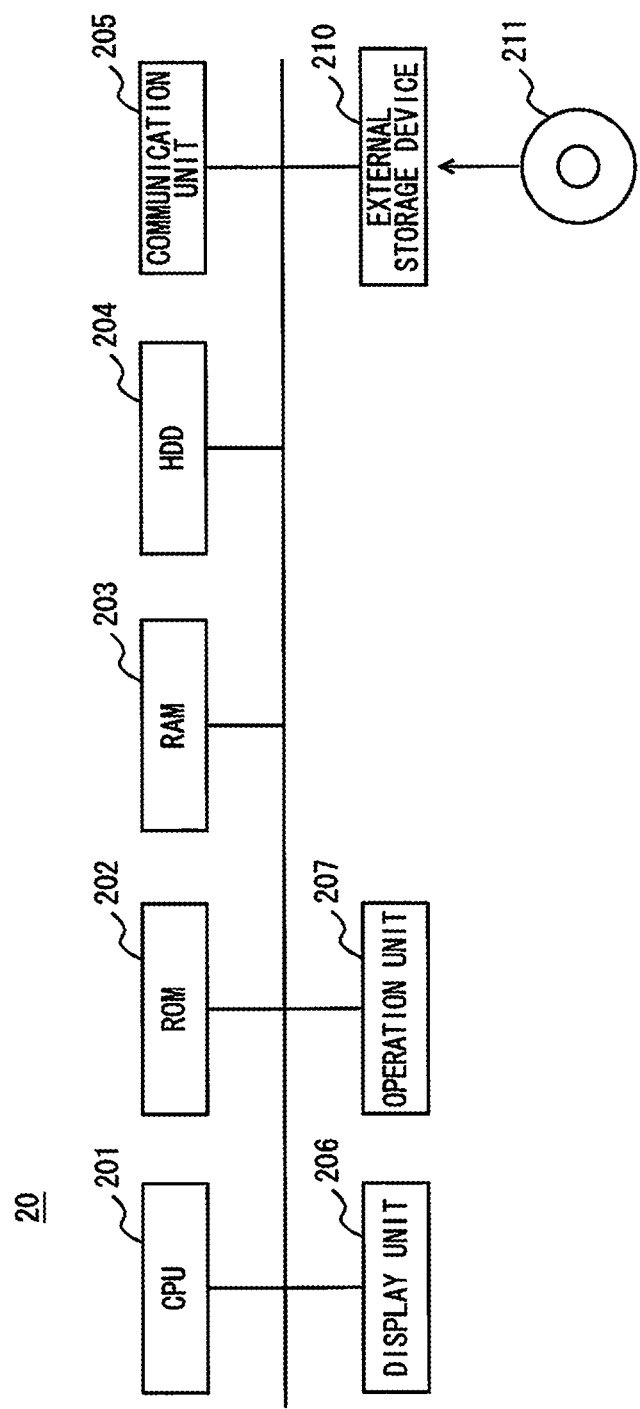
FIG. 2 is a block diagram showing one example of the hardware configuration of a color management server.

FIG. 2 is a block diagram showing one example of the hardware configuration of the color management server. Referring to FIG. 2, the color management server 200 is a computer that executes an arithmetic process and includes a CPU (Central Processing Unit) 201 for controlling the color management server 200 as a whole, a ROM (Read Only Memory) 202 for storing a program to be executed by the CPU 201, a RAM (Random Access Memory) 203 that is used as a work area for the CPU 201, a HDD 204 for storing data in a non-volatile manner, a communication unit 205 that connects the CPU 201 to the network 5, a display unit 206 that displays information, an operation unit 207 that receives input by a user's operation and an external storage device 210.

The communication unit 205 is an interface for connecting the color management server 200 to the network 5. Therefore, the CPU 201 can communicate with the terminal devices 100, 100A to 100C connected to the network 5 via the communication unit 205.

The CPU 201 downloads a program from a computer connected to the network 5 and stores the program in the HDD 204. Further, in a case in which the computer connected to the network 5 writes a program into the HDD 204, the program is stored in the HDD 204. The CPU 201 loads the program stored in the HDD 204 into the RAM 203 for execution.

The external storage device 210 is mounted with a CD-ROM (Compact Disk Read Only Memory) 211. In the present embodiment, the CPU 201 executes a program stored in the ROM 202 or the HDD 204, by way of example. The CPU 201 may control the external storage device 210, read a program to be executed by the CPU 201 from the CD-ROM 211 and store the read program in the RAM 203 for execution.

A recording medium for storing a program to be executed by the CPU 201 is not limited to the CD-ROM 211 but may be a flexible disc, a cassette tape, an optical disc (MO (Magnetic Optical Disc)/MD (Mini Disc)/DVD (Digital Versatile Disc)), an IC card, an optical card, or a semiconductor memory such as a mask ROM or an EPROM (Erasable Programmable ROM). The program referred to here includes not only a program directly executable by the CPU 201 but also a source program, a compressed program, an encrypted program and the like.

The HDD 204 stores various information used for color management as well as a program to be executed by the CPU 201. Various data used for color management includes information in regard to the printing devices 101 to 106, patch image data representing a patch image, a target configuration and tracking information.

Figure 3:
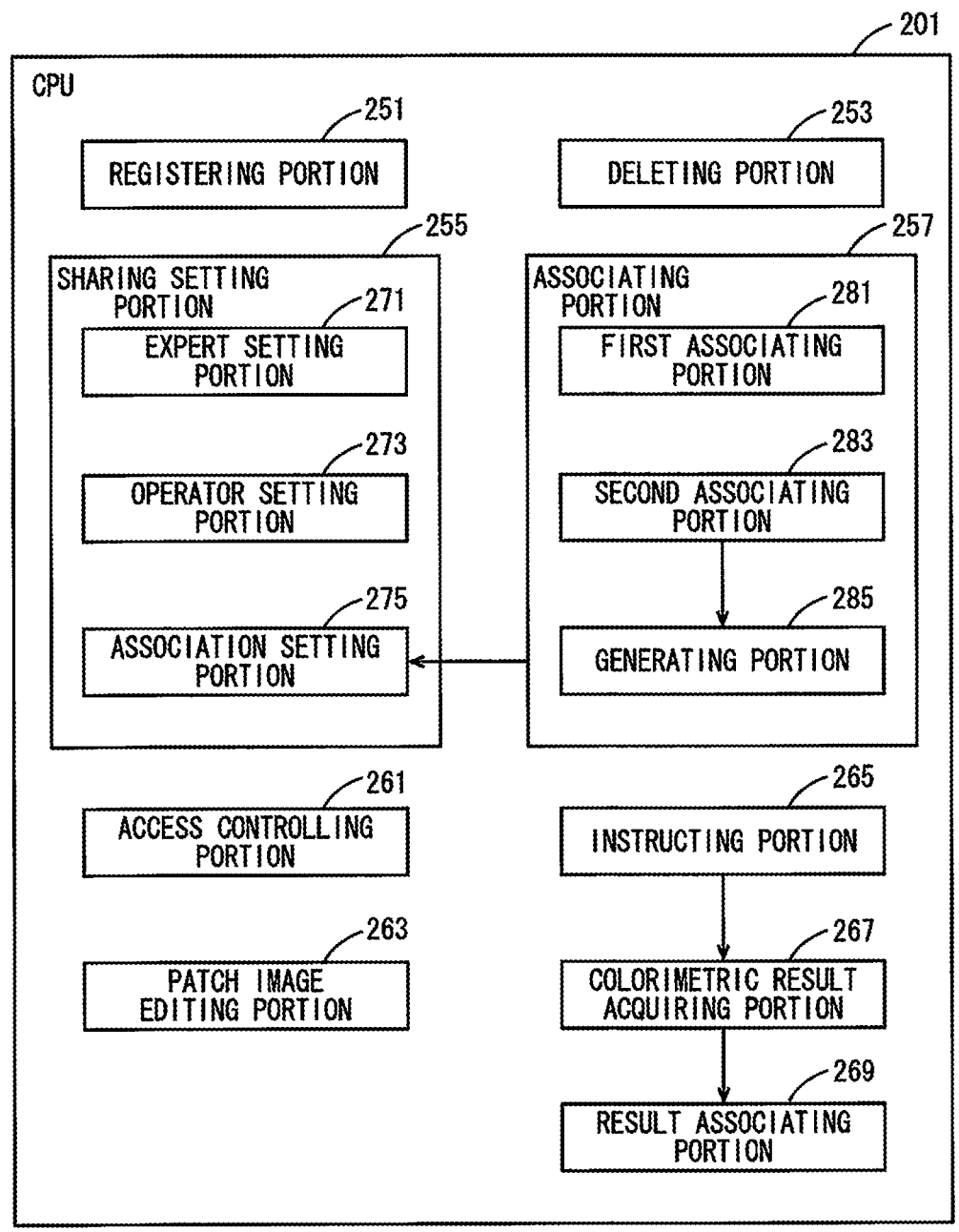
FIG. 3 is a diagram showing one example of the functions of a CPU included in a color management server in the present embodiment.

FIG. 3 is a diagram showing one example of the functions of the CPU included in the color management server in the present embodiment. The functions shown in FIG. 3 are formed in the CPU 201 by execution of a color management program stored in the ROM 202, the HDD 204 or the CD-ROM 211 by the CPU 201 included in the color management server 200. Referring to FIG. 3, the CPU 201 includes a registering portion 251, a deleting portion 253, a sharing setting portion 255, an associating portion 257, an access controlling portion 261, a patch image editing portion 63, an instructing portion 265, a colorimetric result acquiring portion 267 and a result associating portion 269.

The access controlling portion 261 controls the communication unit 205 to authenticate a user who operates any of the terminal devices 100, 100A to 100C. For example, the access controlling portion 261 receives a log-in request from the terminal device 100 and requests transmission of authentication information. The terminal device 100 returns authentication information input by a user who operates the terminal device 100. The access controlling portion 261 authenticates the user who operates the terminal device 100 based on the authentication information received from the terminal device 100. Although not being limited to, authentication information is a set of a user ID and a password. In a case in which the user is authenticated based on the authentication information, the access controlling portion 261 specifies the user and then responds to a request received from the terminal device 100 in a predetermined range of right with respect to the user. The predetermined range will be described below.

The registering portion 251 registers various data used for color management. The registering portion 251 registers various data in accordance with an instruction provided by the color expert. The various data used for color management includes patch image data, a target configuration and tracking information. Specifically, in response to receiving an instruction for registering various data input by the color expert, the registering portion 251 stores the various data in the HDD 204. Identification information for identifying a patch image, a target configuration and tracking information is given to the patch image data, the target configuration and the tracking information stored in the HDD 204.

In a case in which storing patch image data in the HDD 204, the registering portion 251 generates a patch image sharing record including patch image identification information for identifying the patch image data and adds the patch image sharing record to a patch image sharing table stored in the HDD 204. In a case in which storing a target configuration in the HDD 204, the registering portion 251 generates a color management sharing record including color management identification information for identifying the target configuration and adds the color management sharing record to a color management sharing table stored in the HDD 204. In a case in which storing tracking information in the HDD 204, the registering portion 251 generates a tracking information sharing record including tracking identification information for identifying the tracking information and adds the tracking information sharing record to a tracking information sharing table stored in the HDD 204.

The associating portion 257 includes a first associating portion 281, a second associating portion 283 and a generating portion 285. The first associating portion 281 associates a patch image with a target configuration in accordance with an instruction input by the color expert. There may be a plurality of patch images and a plurality of target configurations. The first associating portion 281 associates any of a plurality of patch images with at least one of a plurality of target configurations. A plurality of target configurations may be associated with one patch image, and one target configuration may be associated with a plurality of patch images. Specifically, in a case in which associating a patch image with a target configuration, the first associating portion 281 generates an association record including patch image identification information for identifying patch image data representing the patch image and color management identification information for identifying the target configuration and adds the association record to an association table stored in the HDD 204.

The second associating portion 283 associates a target configuration with a printing device in accordance with an instruction provided by the color expert. There may be a plurality of target configurations and a plurality of printing devices. The second associating portion 283 associates any of a plurality of target configurations with at least one of a plurality of printing devices. A plurality of printing devices may be associated with one target configuration, and one printing device may be associated with a plurality of printing devices.

The generating portion 285 generates tracking information based on a target configuration and a printing device associated with each other by the second associating portion 283. The tracking information is the information that associates the target configuration with the printing device. In a case in which a target configuration is associated with a printing device by the second associating portion 283, the generating portion 285 generates tracking information including color management identification information for identifying the target configuration and device identification information for identifying the printing device, and stores the tracking information in the HDD 204. Specifically, the generating portion 285 generates a tracking information record including tracking identification information for identifying the tracking information and the tracking information, and adds the tracking information record to a tracking information table stored in the HDD 204. A plurality of printing devices may be associated with one target configuration by the second associating portion 283. In this case, the generating portion 285 adds the same number of tracking information records as the number of the plurality of printing devices to the tracking information table. One printing device may be associated with a plurality of target configurations by the second associating portion 283. In this case, the generating portion 285 adds the same number of tracking information records as the number of the plurality of target configurations to the tracking information table.

FIG. 4 is a diagram showing one example of the format of an association record. Referring to FIG. 4, an association record includes an item for color management setting information and an item for a patch image. In the item for color management setting information, color management identification information for identifying a target configuration is set. In the item for a patch image, patch image identification information for identifying patch image data is set.

FIG. 5 is a diagram showing one example of the format of a tracking information record. Referring to FIG. 5, a tracking information record includes an item for tracking information, an item for color management setting information and an item for a printing device. In the item for tracking information, tracking identification information for identifying tracking information is set. In the item for color management setting information, color management identification information for identifying a target configuration is set. In the item for a printing device, device identification information for identifying any of the printing devices 101 to 106 is set.

Returning to FIG. 3, the sharing setting portion 255 sets a right for allowing a user to access various information stored in the HDD 204. Specifically, the sharing setting portion 255 sets a right for each of various data with respect to each of the color expert and the operators A to C. The various data set by the sharing setting portion includes a patch image, a target configuration and tracking information.

The sharing setting portion 255 includes an expert setting portion 271, an operator setting portion 273 and an association setting portion 275. The expert setting portion 271 sets a right for each of the operators A to C with respect to a patch image, a target configuration and tracking information in accordance with a sharing setting instruction input by the color expert. A sharing setting instruction includes subject data specifying information that specifies any one of a patch image, a target configuration and tracking information, and operator specifying information that specifies at least one of the operators A to C. The expert setting portion 271 sets data specified by the subject data specifying information included in the sharing setting instruction to be accessible to an operator specified by the subject data specifying information.

A patch image sharing table, a color management sharing table and a tracking information sharing table are stored in the HDD 204. When the registering portion 251 registers a patch image, a patch image sharing record including patch image identification information for identifying patch image data of the patch image is added to the patch image sharing table. When the registering portion 251 registers a target configuration, a color management sharing record including color management identification information for identifying the target configuration is added to the color management sharing table. When the generating portion 285 generates tracking information, a tracking information sharing record including tracking identification information for identifying the tracking information is added to the tracking information sharing table.

FIG. 6 is a diagram showing one example of the format of a patch image sharing record. Referring to FIG. 6, a patch image sharing record includes an item for a patch image, an item for the color expert, an item for the operator A, an item for the operator B and an item for the operator C. In the item for a patch image, patch image identification information for identifying patch image data is set. The item for the color expert corresponds to the color expert, and whether the color expert can access a patch image is set. The item for the operator A, the item for the operator B and the item for the operator C respectively correspond to the operator A, the operator B and the operator C, and a symbol representing whether each of the operator A, the operator B and the operator C can access the patch image is set. Symbols representing whether a patch image is accessible are "1" in a case in which the patch image is accessible and "0" in a case in which the patch image is not accessible. When the registering portion 251 registers a patch image, "1" is set in the item for the expert, and "0" is set in each of the items for the operator A, the operator B and the operator C, in the patch image sharing record.

FIG. 7 is a diagram showing one example of the format of a color management sharing record. Referring to FIG. 7, the color management sharing record includes an item for color management setting information, an item for the color expert, an item for the operator A, an item for the operator B and an item for the operator C. In the item for color management setting information, color management identification information for identifying a target configuration is set. The item for the color expert corresponds to the color expert, and whether the color expert can access the target configuration is set. The item for the operator A, the item for the operator B and the item for the operator C respectively correspond to the operator A, the operator B and the operator C, and a symbol representing whether each of the operator A, the operator B and the operator C can access the target configuration is set. Symbols representing whether the target configuration is accessible are "1" in a case in which the target configuration is accessible and "0" in a case in which the target configuration is not accessible. When the registering portion 251 registers the target configuration, "1" is set in the item for the expert, and the "0" is set in each of the items for the operator A, the operator B and the operator C, in the color management sharing record.

FIG. 8 is a diagram showing one example of the format of a tracking information sharing record. Referring to FIG. 8, the tracking information sharing record includes an item for tracking information, an item for the color expert, an item for the operator A, an item for the operator B and an item for the operator C. In the item for tracking information, tracking identification information for identifying tracking information is set. The item for the color expert corresponds to the color expert, and whether the color expert can access tracking information is set. The item for the operator A, the item for the operator B and the item for the operator C respectively correspond to the operator A, the operator B and the operator C, and a symbol representing whether each of the operator A, the operator B and the operator C can access the tracking information is set. Symbols representing whether the target configuration is accessible are "1" in a case in which the target configuration is accessible and "0" in a case in which the target configuration is not accessible. When the generating portion 285 registers the tracking information, "1" is set in the item for the expert, and "0" is set in each of the items for the operator A, the operator B and the operator C, in the tracking information sharing record.

Returning to FIG. 3, in a case in which a sharing setting instruction includes patch image identification information as subject data specifying information, the expert setting portion 271 specifies a patch image sharing record. The expert setting portion 271 refers to the patch image sharing table to specify the patch image sharing record in which the patch image identification information included in the sharing setting instruction is set. Then, the expert setting portion 271 changes the setting in the item corresponding to an operator specified by the operator specifying information included in the sharing setting instruction of the patch image sharing record to the symbol "1" representing accessibility.

In a case in which the sharing setting instruction includes color management identification information as subject data specifying information, the expert setting portion 271 specifies a color management sharing record. The expert setting portion 271 refers to the color management sharing table to specify the color management sharing record in which the color management identification information included in the sharing setting instruction is set. Then, the expert setting portion 271 changes the setting in the item corresponding to the operator specified by the operator specifying information included in the sharing setting instruction in the color management sharing record to the symbol "1" representing accessibility.

In a case in which the sharing setting instruction includes tracking identification information as subject data specifying information, the expert setting portion 271 specifies a tracking information sharing record. The expert setting portion 271 refers to the tracking information to specify the tracking information sharing record in which the tracking identification information included in the sharing setting instruction is set. Then, the expert setting portion 271 changes the setting in the item corresponding to the operator specified by the operator specifying information included in the sharing setting instruction of the tracking information sharing record to the symbol "1" representing accessibility.

The operator setting portion 273 sets a right of any of the operators A to C with respect to a patch image, a target configuration and tracking information in accordance with a sharing setting request input by an operator. A sharing setting request includes subject data specifying information that specifies any of a patch image, a target configuration and tracking information, and operator specifying information that specifies at least one of the operators A to C. The operator setting portion 273 sets a record specified by the subject data specifying information included in the sharing setting request as a process subject. A record set as a process subject by the operator setting portion 273 is a record set accessible to an operator who inputs a sharing setting request.

A sharing setting process executed by the operator setting portion 273 is the same for each of a patch image, a target configuration and tracking information. Therefore, in a case in which a patch image is set as data to be processed, the operator A performs the setting to share the data with the operator B, here, by way of example. In this case, a sharing setting request is input by the operator A, and the sharing setting request includes patch image identification information for identifying patch image data as subject data specifying information and user identification information for identifying the operator B as operator specifying information.

When the sharing setting request is input by the operator A, the operator setting portion 273 requests the operator B to permit access to a patch image. For example, the operator setting portion 273 transmits a permission request screen to the terminal device 100B operated by the operator B, and receives information representing either permission or rejection input by the operator B from the terminal device 100B. Specifically, the terminal device 100B displays the permission request screen received from the color management server 200, and accepts the input representing permission or rejection input by the operator B in accordance with the permission request screen. The terminal device 100B returns the information representing either permission or rejection to the color management server 200. The permission request screen includes at least patch image identification information for identifying the patch image data. The permission request screen may include a patch image. In a case in which the information received from the terminal device 100B represents permission, the operator setting portion 273 performs sharing setting in accordance with the sharing setting request. Specifically, the operator setting portion 273 refers to the patch image sharing table to specify the patch image sharing record in which the patch image identification information included in the sharing setting instruction as a process subject. Then, the operator setting portion 273 changes the setting in the item corresponding to the operator B specified by the user identification information included in the sharing setting request in the patch image sharing record to the symbol "1" representing accessibility. When the information received from the terminal device 100B represents rejection, the operator setting portion 273 transmits information notifying that the operator B has rejected to share the patch image to the terminal device 100A operated by the operator A without changing the patch image sharing record.

In a case in which sharing setting of a target configuration is performed by any of the expert setting portion 271 and the operator setting portion 273, when the target configuration is associated with a patch image by the first associating portion 281, the association setting portion 275 sets the patch image accessible to an authorized operator. The authorized operator is an operator who is set able to access the target configuration.

With a target configuration A and a patch image A associated to each other by the first associating portion 281, the target configuration A is set accessible to the operator A by any one of the expert setting portion 271 and the operator setting portion 273, by way of example. In this case, the operator A is an authorized operator and is set able to access the patch image A.

Specifically, in a case in which the sharing setting of the target configuration A is performed by any of the expert setting portion 271 and the operator setting portion 273, the association setting portion 275 refers to an association table stored in the HDD 204 to specify an association record including the color management identification information of the target configuration the sharing setting of which is performed. In a case in which specifying the association record, the association setting portion 275 refers to the patch image sharing table stored in the HDD 204 to specify the patch image sharing record including the patch image identification information set in the association record. Then, the association setting portion 275 changes the setting in the item corresponding to the operator A in the patch image sharing record to "1" representing accessibility.

In a case where sharing setting of the patch image is performed by any of the expert setting portion 271 and the operator setting portion 273, when the patch image is associated with a target configuration by the first associating portion 281, the association setting portion 275 may set the target configuration accessible to an authorized operator.

In a case in which an access instruction for accessing data is input by the color expert or an operator, the access controlling portion 261 permits the access if the color expert or operator can access the data. Hereinafter, a user who inputs an instruction for accessing data is referred to as an access user. Access users include color experts and operators. Specifically, in a case in which a patch image is requested by an access user, the access controlling portion 261 refers to the patch image sharing table stored in the HDD 204 to determine whether the access user can access the patch image. For example, in a case in which a list of patch images is requested, the access controlling portion 261 extracts a patch image sharing record set accessible to an access user in the patch image sharing table, and transmits the list of patch image data defined by one or more extracted patch image sharing records to a terminal device operated by the access user. Further, in a case in which receiving a transmission request including patch image identification information, the access controlling portion 261 refers to the patch image sharing table, extracts a patch image sharing record including the patch image identification information and being set accessible to an access user, and transmits patch image data defined by the extracted patch image sharing record to a terminal device operated by the access user.

In a case in which a target configuration is requested by an access user, the access controlling portion 261 refers to the color management sharing table stored in the HDD 204 to determine whether the access user can access the target configuration. For example, in a case in which a list of target configurations is requested, the access controlling portion 261 extracts a color management sharing record set accessible to an access user in the color management sharing table, and transmits the list of target configurations defined by one or more extracted color management sharing records to a terminal device operated by the access user. When receiving a transmission request including color management identification information, the access controlling portion 261 refers to the color management sharing table, extracts a color management sharing record including the color management identification information and being set accessible to an access user and transmits the target configuration defined by the extracted color management sharing record to a terminal device operated by the access user.

In a case in which tracking information is requested by an access user, the access controlling portion 261 refers to the tracking information sharing table stored in the HDD 204 to determine whether the access user can access the tracking information. For example, in a case in which a list of tracking information is requested, the access controlling portion 261 extracts a tracking information sharing record set accessible to an access user in the tracking information sharing table, and transmits a list of tracking information defined by one or more extracted tracking information sharing records to a terminal device operated by the access user. In a case in which receiving a transmission request including tracking identification information, the access controlling portion 261 refers to the tracking information sharing table, extracts a tracking information sharing record including the tracking identification information and being set accessible to an access user, and transmits tracking information defined by the extracted tracking information sharing record to a terminal device operated by the access user.

The patch image editing portion 263 generates and changes a patch image. The patch image editing portion 263 transmits an editing screen for displaying a patch image to a terminal device, and edits the patch image based on an instruction received from the terminal device. The patch image editing portion 263 stores patch image data representing an edited patch image in the HDD 204. The patch image editing portion 263 receives only an instruction input by the color expert, and does not receive instructions from the operators A to C. The patch image editing portion 263 may read patch image data stored in the HDD 204 to edit a patch image. In a case in which the patch image editing portion 263 stores patch image data corresponding to a new patch image in the HDD 204, the registering portion 251 registers the new patch image.

The deleting portion 253 deletes patch image data, a target configuration and tracking information stored in the HDD 204. The deleting portion 253 deletes the patch image data, the target configuration and the tracking information in accordance with a deleting instruction input by the color expert. The deleting instruction includes information specifying any one of the patch image data, the target configuration and the tracking information. In a case in which a deleting instruction is input by any of the operators A to C, the deleting portion 253 deletes patch image data, a target configuration and tracking information on a condition that the color experts allow deletion. Data among the patch image data, the target configuration and the tracking information accessible to each of the operators A to C is limited. Therefore, each of the operators A to C can input a deleting instruction including information for specifying accessible data among the patch image data, the target configuration and the tracking information.

The instructing portion 265 receives a colorimetric instruction input by the color expert and notifies an operator of the colorimetric instruction. A colorimetric instruction includes information specifying each of a target configuration, a patch image and a printing device. A colorimetric instruction may include information for identifying tracking information instead of a target configuration and a printing device. In response to receiving the colorimetric instruction, the instructing portion 265 specifies an operator who is in charge of operating the printing device based on device identification information for identifying the printing device included in the colorimetric instruction. A table that associates printing devices that the operators A to C are respectively in charge of operating may be prepared in advance.

Here, the printing device 101 is specified by the colorimetric instruction, by way of example. In this case, the instructing portion 265 specifies the operator A who is in charge of operating the printing device 101 and notifies the operator A of the colorimetric instruction. When the operator A is logged into the system, the instructing portion 265 transmits the colorimetric instruction to the terminal device 100A operated by the operator A. In a case in which the operator A is not logged into the system, the instructing portion 265 transmits the colorimetric instruction to the terminal device 100A operated by the operator A in response to the operator A logging into the system. Further, in a case in which transmission destination information such as e-mail addresses of the operators A, B is registered in advance, the instructing portion 265 may transmit the colorimetric instruction to the operator A using a transmission method defined by the transmission destination information.

When receiving a notification of the colorimetric instruction, the operator A performs colorimetric work in accordance with the colorimetric instruction. Specifically, the operator A causes the printing device 101 specified by the colorimetric instruction to print a patch image specified by the colorimetric instruction. The printing device 101 causes a colorimeter included in the printing device 101 to measure the colors of the patch image printed on a recording medium, and transmits colorimetric data output by the colorimeter to the color management server 200.

In a case in which the communication unit 205 receives the colorimetric data transmitted by the printing device 101, the colorimetric result acquiring portion 267 acquires the colorimetric data as a colorimetric result. The colorimetric result acquiring portion 267 gives identification information to the colorimetric data to store the colorimetric data in the HDD 204.

The result associating portion 269 associates the colorimetric instruction with the colorimetric result. Specifically, the result associating portion 269 generates a colorimetric result association record in which the tracking information and the patch image included in the colorimetric instruction are associated with the colorimetric result, and adds the colorimetric result association record to the colorimetric result association table stored in the HDD 204.

FIG. 9 is a diagram showing one example of the format of a colorimetric result association record. Referring to FIG. 9, the colorimetric result association record includes an item for tracking information, an item for a patch image and an item for colorimetric data. In the item for tracking information, tracking identification information for identifying tracking information is set. In the item for a patch image, patch image identification information for identifying a patch image is set. In the item for colorimetric data, colorimetric data identification information for identifying colorimetric data is set. The color expert can correct a patch image and a target configuration by referring to a color measurement result association record.

Figure 10:
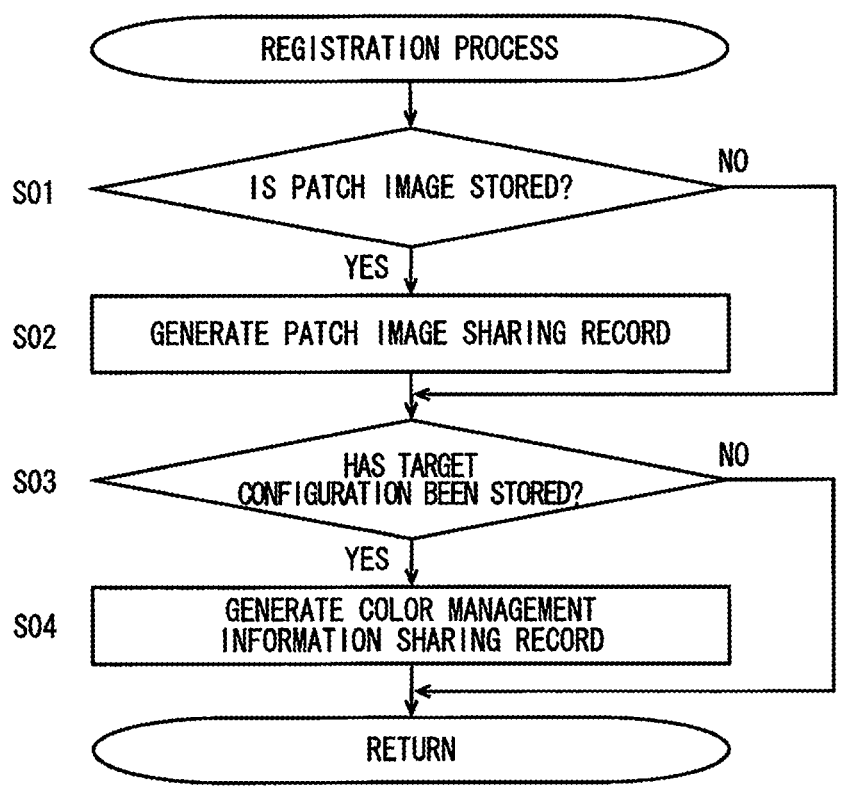
FIG. 10 is a flowchart showing one example of a flow of a registration process.

FIG. 10 is a flowchart showing one example of a flow of a registration process. The registration process is a process executed by the CPU 201 when the CPU 201 included in the color management server 200 executes the color management program stored in the ROM 202, the HDD 204 or the CD-ROM 211. In a case in which a user who has logged into the system is a color expert, the CPU 201 executes a registration process in accordance with an instruction input by the color expert. For example, after the color expert operates the terminal device 100 to log into the system, the CPU 201 executes the registration process in accordance with an instruction received from the terminal device 100.

Referring to FIG. 10, the CPU 201 determines whether a patch image has been stored (step S01). In a case in which the color expert generates a new patch image or edits an existing patch image to generate a new patch image, the new patch image is stored in the HDD 204 as patch image data. In a case in which a new patch image is stored in the HDD 204, the process proceeds to the step S02. If not, the process proceeds to the step S03.

In the step S02, a patch image sharing record is generated, and the process proceeds to the step S03. A patch image sharing record in the format shown in FIG. 6 is generated. At this stage, the symbol "1" representing that an access right is granted is set in the item for a color expert, and the symbol "0" representing that an access right is not granted is set in each of the items for the operator A to the operator C. The generated patch image sharing record is added to the patch image sharing table stored in the HDD 204.

In the step S03, it is determined whether a target configuration has been stored. In a case in which the color expert generates a new target configuration or edits an existing target configuration to create a new target configuration, the new target configuration is stored in the HDD 204. In a case in which the new target configuration is stored in the HDD 204, the process proceeds to the step S04. If not, the registration process ends.

In the step S04, a color management sharing record is generated, and the registration process ends. The generated color management sharing record is added to the color management sharing table stored in the HDD 204. The color management sharing record in the format shown in FIG. 7 is generated. At this stage, the symbol "1" representing that an access right is granted is set in the item for a color expert, and the symbol "0" representing that an access right is not granted is set in each of the items for the operator A to the operator C. The generated color management sharing record is added to the color management sharing table stored in the HDD 204.

Figure 11:
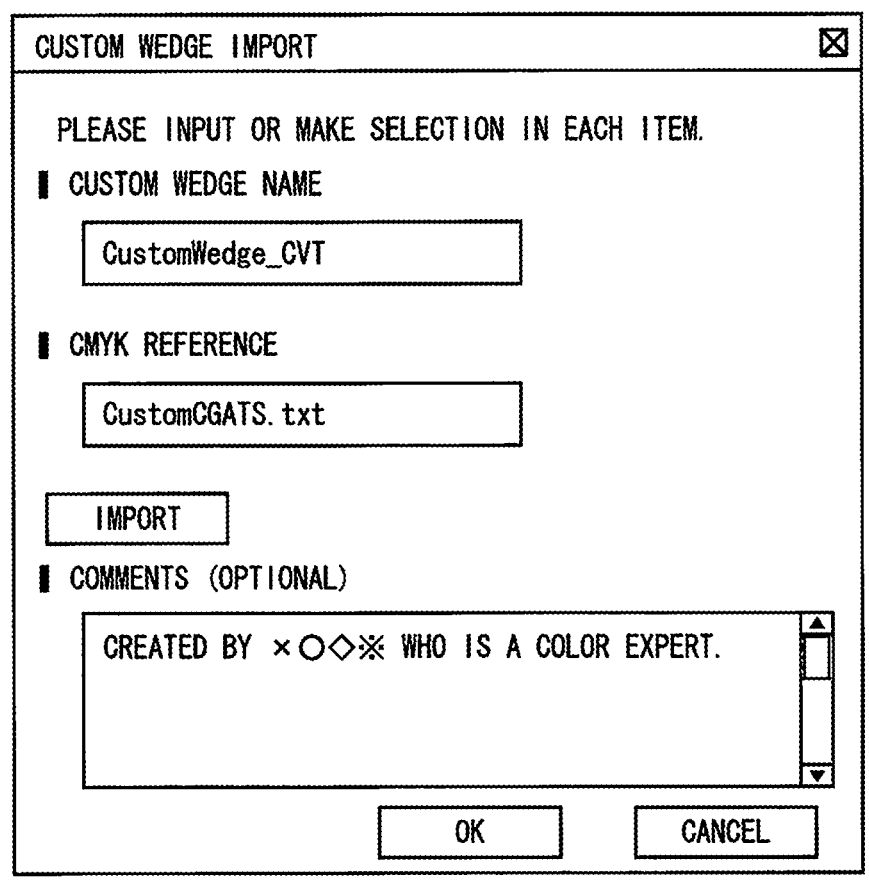
FIG. 11 is a diagram showing one example of a patch image registration screen.

FIG. 11 is a diagram showing one example of a patch image registration screen. Here, a patch image is referred to as a custom wedge. Referring to FIG. 11, the patch image registration screen includes a field for a custom wedge name, a field for a CMYK reference and a field for comments and a button in which the characters for "IMPORT" are displayed. In the field for a custom wedge name, patch image identification information for identifying patch image data is set. In the field for a CMYK reference, a CMYK reference name of a reference defining a value for conversion of the color of a patch image represented by the CMYK color space into the RGB color space is set. Any character string is set in the field for comments. The patch image data specified by the patch image identification information set in the custom wedge name field is registered in response to designation of the button in which the characters for "IMPORT" are displayed.

Figure 12:
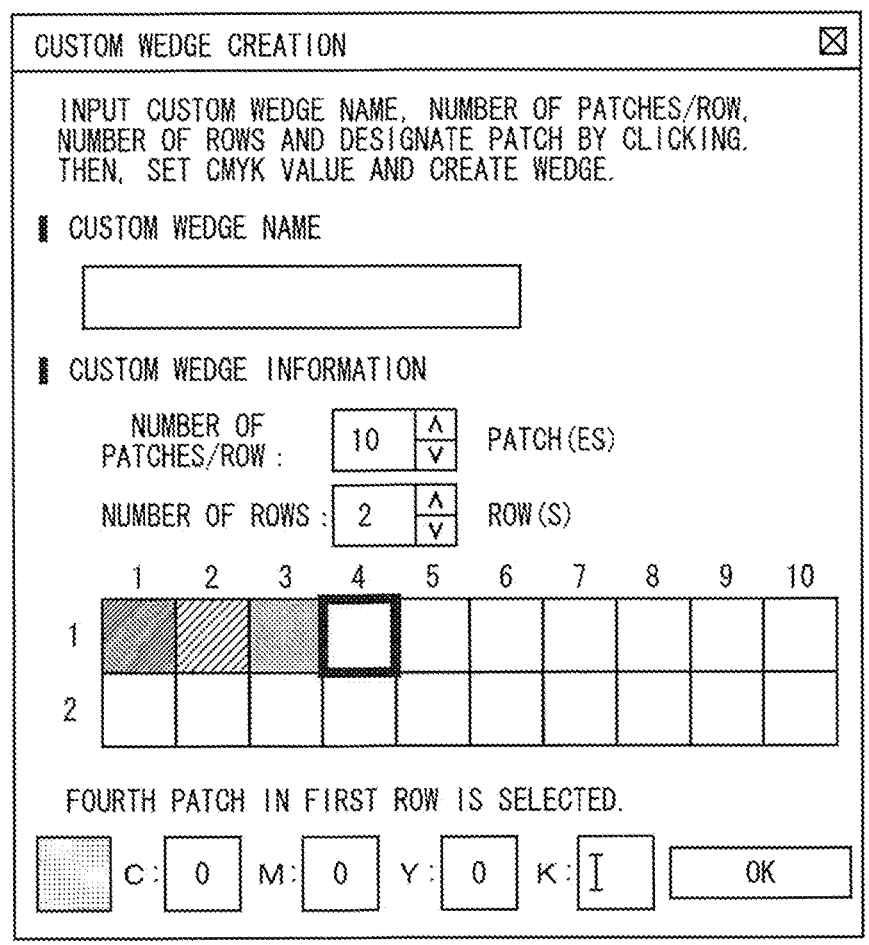
FIG. 12 is a diagram showing one example of a patch image generation screen.

FIG. 12 is a diagram showing one example of a patch image generation screen. Referring to FIG. 12, the patch image generation screen includes a field for a custom wedge name and an area for custom wedge information. In the field for a custom wedge name, patch image identification information for identifying patch image data is set. The area for custom wedge information includes an arrangement designation area for designating rows and columns for 20 patches arranged in 2 rows and 10 columns, a display area for displaying the 20 patches arranged in 2 rows and 10 columns and a setting area for setting colors of the patches. In the display area, the patch located in the first row and the fourth column is selected as a process subject. In the setting area, 0 is set as a value for C, M and Y. In regard to the value for K, it is shown that a user is in the middle of setting a value. In the leftmost box of the setting area, the color defined by the respective set values for CMYK is displayed. Further, the same color is displayed in the portion of the patch located in the first row and the fourth column of the display area. In response to designation of the button in which the characters for "OK" are displayed, patch image data including the patch image identification information set in the field for a custom wedge name is stored in the HDD 204.

Figure 13:
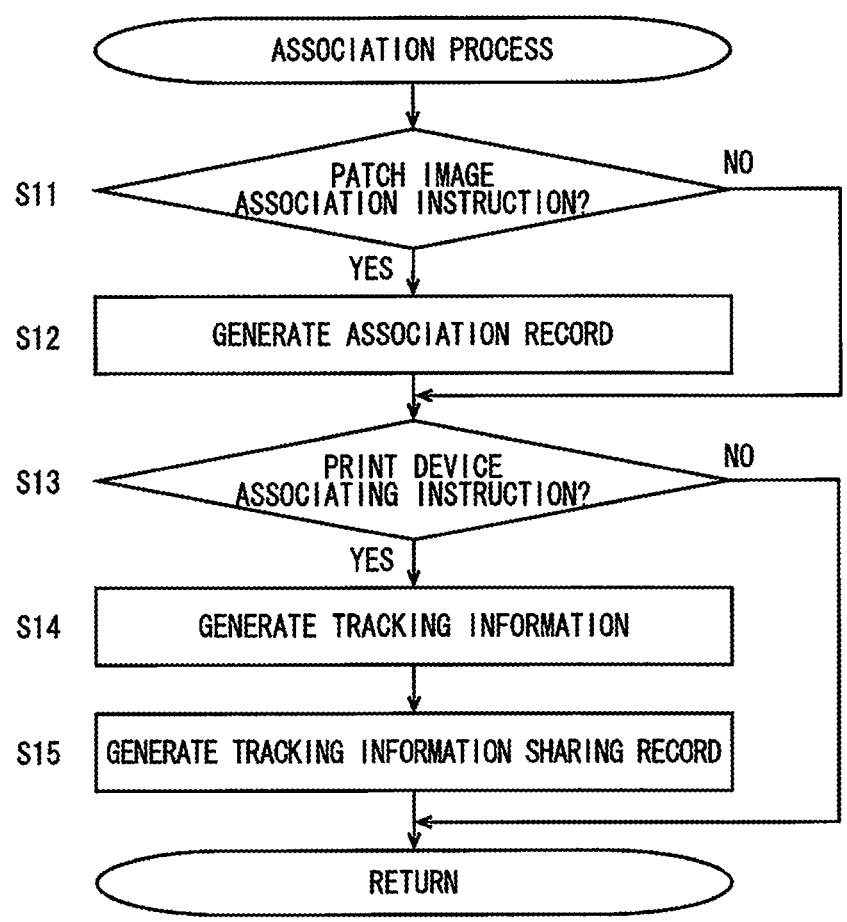
FIG. 13 is a flowchart showing one example of a flow of an association process.

FIG. 13 is a flowchart showing one example of a flow of an association process. The association process is a process executed by the CPU 201 when the CPU 201 included in the color management server 200 executes the color management program stored in the ROM 202, the HDD 204 or the CD-ROM 211. In a case in which a user who has logged into the system is a color expert, the CPU 201 executes the association process in accordance with an instruction input by the color expert.

Referring to FIG. 13, the CPU 201 determines whether a patch image association instruction has been accepted (step S11). If the patch image association instruction has been accepted, the CPU 201 proceeds the process to the step S12. If not, the CPU 201 proceeds the process to the step S13. The patch image association instruction is an instruction for associating a target configuration with a patch image, and each of the target configuration and the patch image is specified. For example, the patch image association instruction includes color management identification information and patch image identification information.

In the step S12, an association record is generated, and the process proceeds to the step S13. Based on the color management identification information and the patch image identification information included in the patch image association instruction, an association record in the format shown in FIG. 4 is generated. The generated association record is added to the association table stored in the HDD 204.

In the step S13, it is determined whether a printing device associating instruction has been received. If the printing device associating instruction has been accepted, the process proceeds to step S14. If not, the association process ends. The printing device associating instruction is an instruction for associating a target configuration with a printing device, and each of the target configuration and the printing device is specified. For example, the printing device associating instruction includes color management identification information and device identification information.

In the step S14, tracking information is generated, and the process proceeds to the step S15. The tracking information is the information that associates the target configuration with the printing device. The tracking information is generated based on the color management identification information and the device identification information included in the printer associating instruction. The generated tracking information is provided with tracking identification information to be stored in the HDD 204.

In the step S15, a tracking information sharing record is generated, and the association process ends. The tracking information sharing record in the format shown in FIG. 8 is generated. At this stage, the symbol "1" representing that an access right is granted is set in the item for a color expert, and the symbol "0" representing that an access right is not granted is set in each of the items for the operator A to the operator C. The generated tracking information sharing record is added to the tracking information sharing table stored in the HDD 204.

FIG. 14 is a diagram showing one example of a tracking information generation screen. Referring to FIG. 14, the tracking information generation screen includes two left and right areas, and the left area includes a field for a tracking name and a field for a target configuration, and the right area is an area for specifying a printing device. In the field for a tracking name, tracking identification information given to tracking information is set. In the field for a target configuration, color management identification information for identifying a target configuration is set.

The right area includes a field for a section, a field for a printer name, a field for a printer model and a field for a printer serial number. In the field for a section, a range for managing a printing device is set. The range for managing a printing device may be a range indicated by a group including a plurality of persons in an organization or may be a geographical range. Here, in the field for a printer name, device identification information for identifying a printing device is set. In the field for a printer model, the type of a printing device is set. In the field for a printer serial number, a manufacturing number of a printing device is set. Settings for the field for a section, the field for a printer mode and the field for a printer serial number are optional. In response to designation of the button in which the characters for "OK" are displayed, tracking information that associates the target configuration specified by the color management identification information set in the field for a target configuration with the printing device set in the field for a printer name is generated. The generated tracking information is provided with the tracking identification information set in the field for a tracking name to be stored in the HDD 204.

Figure 15:
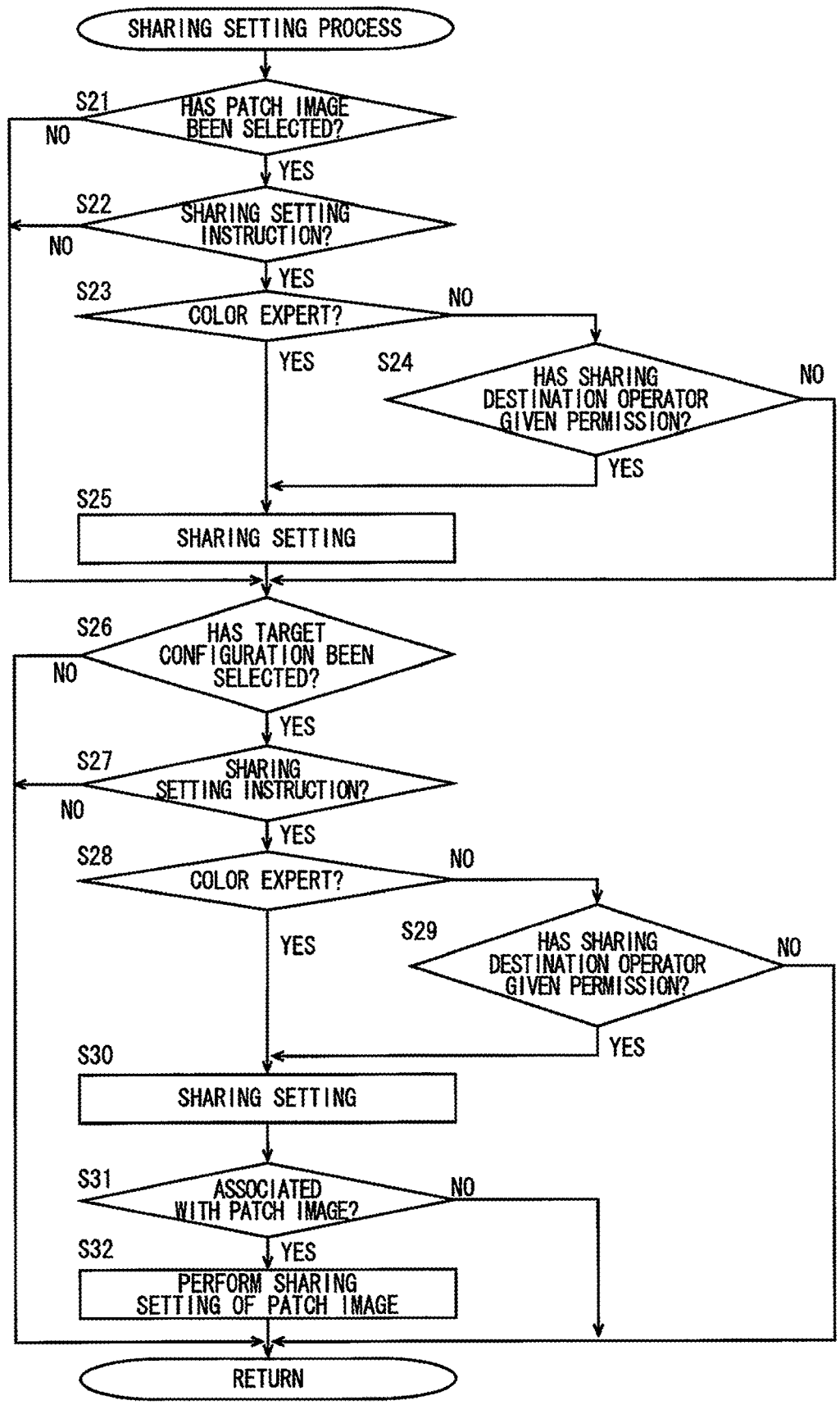
FIG. 15 is a flowchart showing one example of a flow of a sharing setting process.

FIG. 15 is a flowchart showing one example of a flow of a sharing setting process. The sharing setting process is a process executed by the CPU 201 when the CPU 201 included in the color management server 200 executes the color management program stored in the ROM 202, the HDD 204 or the CD-ROM 211.

Referring to FIG. 15, the CPU 201 determines whether a patch image has been selected. If a patch image has been selected, the process proceeds to the step S22. If not, the process proceeds to the step S26. For example, in a case in which any one of the color expert and the operators A to C selects a patch image from a list of patch images, it is determined that the patch image has been selected. Because being permitted to access only a patch image, which each operator is permitted to access, each of the operators A to C can select a patch image, which each operator is permitted to access.

In the step S22, it is determined whether a sharing setting instruction has been received. The sharing setting instruction includes user identification information for identifying a sharing destination operator. The sharing destination operator is an operator to be provided with an access right. If the sharing setting instruction is accepted, the process proceeds to step S23. If not, the process proceeds to the step S26. In the step S23, it is determined whether a user who has input the sharing setting instruction is a color expert. If the user is a color expert, the process proceeds to the step S25. If the operator is any one of the operators A to C, the process proceeds to the step S24.

In the step S24, it is determined whether permission given by the sharing destination operator has been accepted. If the sharing destination operator gives permission, the process proceeds to the step S25. If not, the process proceeds to the step S26. A sharing source operator notifies the sharing destination operator that an access right to a patch image is granted. The sharing source operator is an operator who has input the sharing setting instruction. In a case in which the sharing destination operator responds to the notification to accept the access right, it is determined that the sharing destination operator has given permission. In a case in which the sharing destination operator does not respond to the notification or in a case where the sharing destination operator responds to the notification not to accept the access right, it is determined that the sharing destination operator has not given permission.

In the step S25, the sharing setting is performed, and the process proceeds to the step S26. A patch image sharing record included in the patch image sharing table stored in the HDD 204 is updated. Specifically, reference is made to the patch image sharing table, and the patch image sharing record in which the patch image identification information for identifying the patch image selected in the step S21 is set is extracted. Then, the symbol "1" representing permission of access is set in the item corresponding to the sharing destination operator in the patch image sharing record. The sharing destination operator is specified by user identification information included in the sharing setting instruction.

In the step S26, it is determined whether a target configuration has been selected. If a target configuration has been selected, the process proceeds to the step S27. If not, the sharing setting process ends. For example, in a case in which any of the color expert and the operators A to C selects a target configuration from the list of target configurations, it is determined that the target configuration has been selected. Because being permitted to access only a target configuration, which each operator is permitted to access, each of the operators A to C can select the target configuration to which each operator is permitted to access.

In the step S27, it is determined whether the sharing setting instruction has been accepted. The sharing setting instruction includes user identification information for identifying a sharing destination operator. The sharing destination operator is an operator to be provided with an access right. If the share setting instruction has been accepted, the process proceeds to the step S28. If not, the share setting process ends. In the step S28, it is determined whether the user who has input the sharing setting instruction is a color expert. If the user is a color expert, the process proceeds to the step S30. If the operator is any one of the operators A to C, the process proceeds to the step S29.

In the step S29, it is determined whether permission given by the sharing destination operator has been accepted. If the sharing destination operator has given permission, the process proceeds to the step S30. If not, the sharing setting process ends. The sharing source operator notifies the sharing destination operator that an access right to the target configuration is granted. The sharing source operator is an operator who has input the sharing setting instruction. In a case in which the sharing destination operator responds to the notification to accept the access right, it is determined that the sharing destination operator has given permission. In a case in which the sharing destination operator does not respond to the notification or in a case where the sharing destination operator responds to the notification not to accept the access right, it is determined that the sharing destination operator has not given permission.

In the step S30, the sharing setting is performed, and the process proceeds to the step S31. A color management sharing record included in the color management sharing table stored in the HDD 204 is updated. Specifically, reference is made to the color management sharing table, and the color management sharing record in which the color management identification information for identifying the target configuration selected in the step S26 is set is extracted. Then, the symbol "1" representing permission of access is set in the item corresponding to the sharing destination operator in the color management sharing record. The sharing destination operator is specified by user identification information included in the sharing setting instruction.

In the step S31, it is determined whether the target configuration is associated with a patch image. If the target configuration is associated with a patch image, the process proceeds to the step S32. If not, the sharing setting process ends. Reference is made to the association table stored in the HDD 204, and the association record in which the color management identification information for identifying the target configuration selected in the step S26 is set is extracted. In a case in which such an association record is extracted, it is determined that the target configuration is associated with the patch image.

In the step S32, the sharing setting of the patch image associated with the target configuration is performed, and the sharing setting process ends. A patch image sharing record included in the patch image sharing table stored in the HDD 204 is updated. Specifically, reference is made to the patch image sharing table, and the patch image sharing record in which the patch image identification information for identifying the patch image that is determined to be associated with the target configuration in the step S31 is set is extracted. Then, the symbol "1" representing permission of access is set in the item corresponding to the sharing destination operator in the patch image sharing record. The sharing destination operator is a user specified by the user identification information included in the sharing setting instruction.

FIG. 16 is a first diagram showing one example of a patch image list screen. Referring to FIG. 16, the patch image list screen includes a record of one row for each patch image data. In FIG. 16, eight records respectively corresponding to seven patch image data pieces are displayed. A record displayed in the patch image list screen includes an item for sharing, an item for being in use, an item for a custom wedge, an item for an owner company, an item for creation/import date and time and an item for comments. Patch image identification information is set in the item for a custom wedge. User identification information for identifying a color expert who has generated patch image data is set in the item for an owner company. Here, the user identification information of a color expert is the name of the company to which the color expert belongs. In the item for creation/import date and time, the date and time when patch image data is created or the date and time when the patch image data is registered in the system is set. In the item for comments, any character string is set.

A record in which an image represented by the symbol < . . . > is set in the item for sharing indicates that a patch image corresponding to the record is set to be shared. When a patch image is set to be shared, it indicates that the image is set accessible to a plurality of operators. In FIG. 16, it is shown that four patch images corresponding to the records in the third to sixth rows are set to be shared.

Further, when a check box at the left of the record in the first row is checked, and the entire record is highlighted. A user can select a record as a process subject by checking a check box, and the patch image of the record in the first row is indicated as a processing subject by highlighting.

Figure 17:
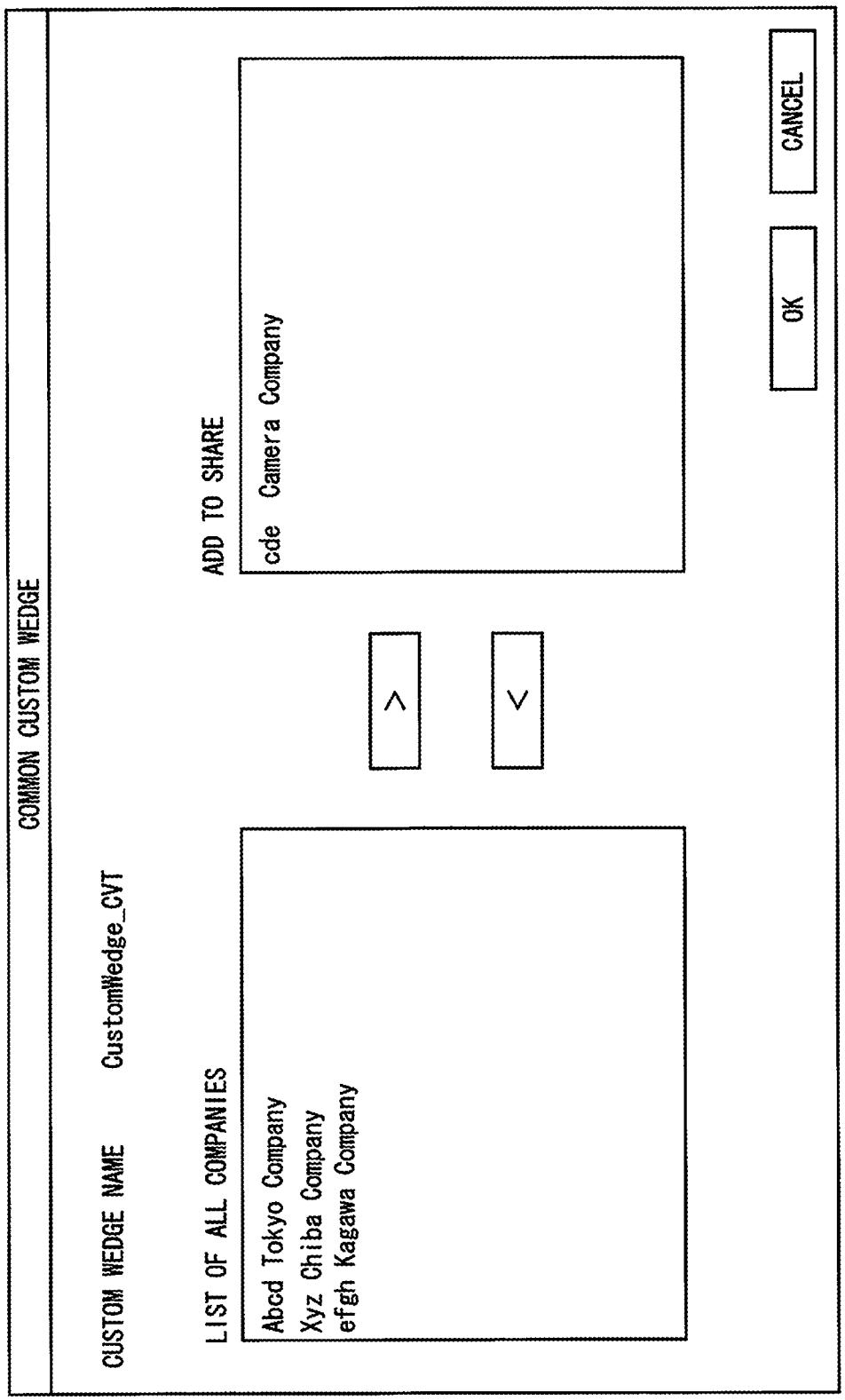
FIG. 17 is a diagram showing one example of a sharing operator setting screen.

FIG. 17 is a diagram showing one example of a sharing operator setting screen. Referring to FIG. 17, the sharing operator setting screen includes an item for a custom wedge name and two areas at the left and right of the screen. In the item for a custom wedge, patch image identification information for identifying patch image data of a patch image to be processed is displayed. As for the two areas, the left area is a candidate area, and the right area is a permission area. In the candidate area, user identification information for identifying an operator who is a candidate for being provided with an access right is displayed. In the permission area, user identification information of an operator who is provided with an access right is displayed. In a case in which the arrow between the candidate area and the permission area is designated, the selected user identification information moves between the candidate area and the permission area. A patch image corresponding to patch image data of the patch image identification information displayed in the item for a custom wedge is set accessible to an operator specified by the user identification information displayed in the permission area.

FIG. 18 is a diagram showing one example of a sharing application screen. The sharing application screen is displayed in a case in which an operator selects a patch image in the patch image list screen shown in FIG. 16 and then designates another operator as a sharing destination operator using the sharing operator setting screen shown in FIG. 17. Referring to FIG. 18, the sharing application screen includes an input area in which an e-mail address is input and a confirmation area. The input area is an area in which an e-mail address assigned to a sharing destination operator who is to be provided with an access right is input. In the confirmation area, the same e-mail address as the e-mail address input in the input area is input. In a case in which the e-mail address in the input area matches the e-mail address in the confirmation area, a sharing application e-mail is transmitted to the e-mail address input in the input area. The sharing application e-mail includes a link key for enabling the sharing destination operator who is to be provided with an access right to access the patch image. A link key is information for authenticating a sharing destination operator to be provided with an access right. Any character string can be used as a link key.

FIG. 19 is a diagram showing one example of a link key acceptance screen. The link key acceptance screen is displayed in a case in which a sharing destination operator to be provided with an access right is logged into the system or after a sharing destination operator to be provided with an access right is logged into the system. Referring to FIG. 19, the link key acceptance screen includes an area in which a link key is input. A sharing destination operator to be provided with an access right receives an e-mail transmitted from the system. The e-mail includes a link key. When a sharing destination operator to be provided with an access right inputs the link key in the link key acceptance screen, a sharing acceptance screen is displayed.

FIG. 20 is a diagram showing one example of the sharing acceptance screen. Referring to FIG. 20, the sharing acceptance screen includes an item for a custom wedge name, an item for a link key and an item for a sharing source. In the item for a custom wedge name, patch image identification information for identifying a patch image is displayed. In the item for a link key, a link key is displayed. In the item for a sharing source, user identification information of a sharing source operator who has applied for access permission is displayed. In a case in which a sharing destination operator to be provided with an access right designates a button in which the characters for "ACCEPT" are displayed, a patch image specified by patch image identification information displayed in the item for a custom wedge name is set accessible to the sharing destination operator.

FIG. 21 is a second diagram showing one example of the patch image list screen. Referring to FIG. 21, in the record in the first row, the symbol < . . . > representing sharing setting is added to the item for sharing. Therefore, in a case in which the patch image list screen shown in FIG. 21 is a patch image list screen viewed by a color expert, it is indicated that the patch image in the record of the first row is set accessible to a plurality of operators. Further, in a case in which the patch image list screen shown in FIG. 21 is a patch image list screen viewed by an operator, it is indicated that the patch image of the record in the first row is set accessible to another operator.

Figure 22:
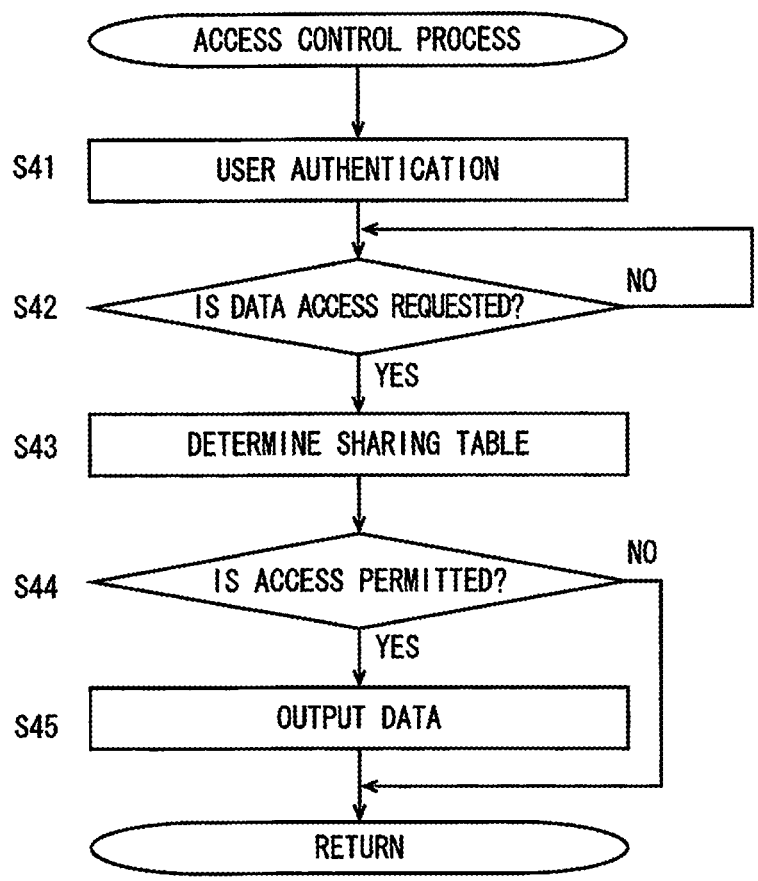
FIG. 22 is a flowchart showing one example of a flow of an access control process.

FIG. 22 is a flowchart showing one example of a flow of an access control process. The access control process is a process executed by the CPU 201 when the CPU 201 included in the color management server 200 executes the color management program stored in the ROM 202, the HDD 204 or the CD-ROM 211.

Referring to FIG. 22, the CPU 201 authenticates the user (step S41), and the process proceeds to the step S42. At this stage, a user who is permitted to log into the system is specified.

In the step S42, whether a data-access request has been accepted is determined. The process waits until the data-access request is accepted (NO in the step S42). If the data-access request is accepted (YES in the step S42), the process proceeds to the step S43. The data is one of patch image data, a target configuration and tracking information. Further, the access request may be a request for designating data or a request for displaying a list.

In the step S43, a sharing table is determined. Because a path image sharing table is defined with respect to a patch image, a color management sharing table is defined with respect to a target configuration and a tracking information sharing table is defined with respect to tracking information, a sharing table corresponding to data in regard to which an access request is made in the step S42.

In the step S44, it is determined whether access is permitted. With reference to the sharing table determined in the step S43, it is determined whether the user who is authenticated in the step S41 can access the date designated in the step S42. If the access is permitted, the process proceeds to the step S45. If not, the access control process ends. In a case in which an access-request requests the display of a list of data, when even one record is accessible to the user who is authenticated in the step S41 in the sharing table, it is determined that the access is permitted.

In the step S45, the accessible data is output, and the access control process ends. Data is output to the terminal device operated by the user who is authenticated in the step S41. In a case in which the access-request requests the display of the list of data, the data specified by the respective records accessible to the user who is authenticated in the step S41 is output from the sharing table.

Figure 23:
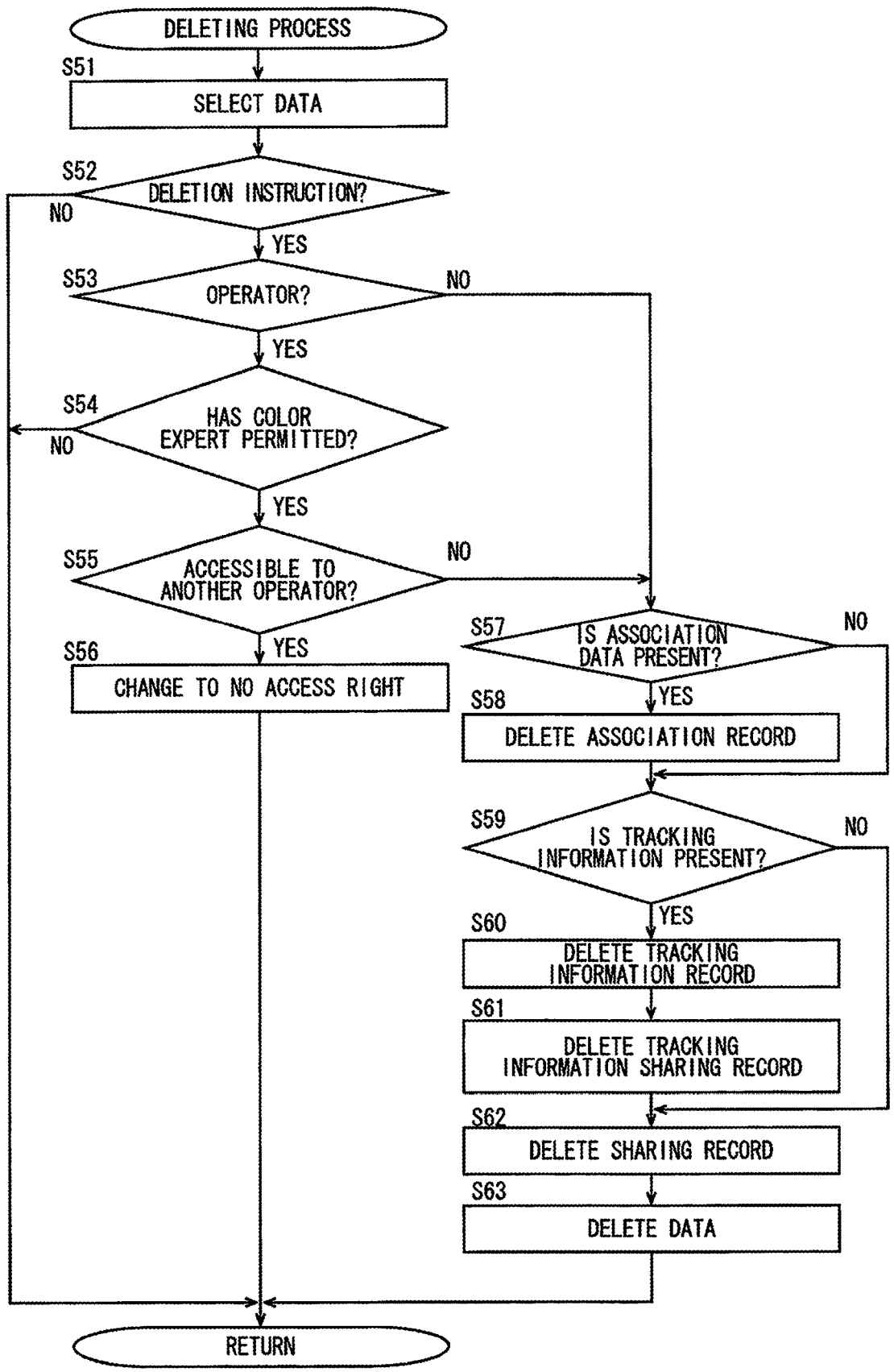
FIG. 23 is a flowchart showing one example of a flow of a deleting process.

FIG. 23 is a flowchart showing one example of a flow of a deleting process. The deleting process is a process executed by the CPU 201 when the CPU 201 included in the color management server 200 executes the color management program stored in the ROM 202, the HDD 204 or the CD-ROM 211.

Referring to FIG. 23, the CPU 201 selects data to be deleted (step S51), and the process proceeds to the step S52. The data designated by a user is set as a deletion subject. The data to be deleted is one of patch image data, a target configuration and tracking information. Further, because being permitted to access only data, which each operator is permitted to access, each of the operators A to C can designate data, which the operator is permitted to access, as a deletion subject.

In the step S52, it is determined whether the deleting instruction has been accepted. If the deleting instruction has been accepted, the process proceeds to the step S53. If not, the deletion process ends. In the step S53, whether the user who has input the deleting instruction is an operator is determined. If the user who has input the deleting instruction is an operator, the process proceeds to the step S54. If not, the process proceeds to the step S57.

In the step S54, whether a color expert has permitted deletion is determined. In a case in which deletion is permitted by the color expert, the process proceeds to the step S55. If not, the deletion process ends. The color expert is notified that an operator who has input the deleting instruction has requested data to be deleted. A deletion approval screen is displayed in the terminal device 100 operated by the color expert, for example. Then, in a case in which the color expert responds to the notification to approve the request, it is determined that the color expert has permitted deletion. On the other hand, in a case in which the color expert does not respond to the notification or responds to the notification not to approve the request, it is determined that the color expert has not permitted deletion. If the color expert does not permit deletion, the data is not to be deleted. This keeps the data available for subsequent use by the color expert.

In the step S55, it is determined whether data to be deleted is set accessible to another operator. Reference is made to a sharing table corresponding to the data, and whether an operator different from the operator who has input the deletion instruction is set able to access the data is determined. If another operator is set able to access the data, the process proceeds to the step S56. If not, the process proceeds to the step S57. In the step S56, the operator who has input the deletion instruction with respect to the data to be deleted is changed from having an access right to not having an access right, and the deletion process ends. Specifically, in regard to the record corresponding to a deletion subject included in the sharing table, the symbol "0" representing that access is not allowed is set in the item corresponding to the operator who has input the deletion instruction.

In the step S57, whether the association data with respect to the data to be deleted is present is determined. The association data is the data associated with the data. In a case in which the data to be deleted is a patch image or a target configuration, one may be associated with the other. In a case in which reference is made to the association table stored in the HDD 204, and an association record including the data identification information of the data to be deleted is present, the process proceeds to the step S58. If not, the process proceeds to the step S59. In the step S58, the association record including the data identification information of the data to be deleted is deleted from the association table stored in the HDD 204, and the process proceeds to the step S59.

In the step S59, whether tracking information corresponding to the data to be deleted is present is determined. In a case in which the data to be deleted is a target configuration, a tracking information record may be present. Reference is made to the tracking information table stored in the HDD 204, and whether a tracking information record including color management identification information for identifying a target configuration which is the data to be detected is present is determined. If the tracking information record is present, the process proceeds to the step S60. If not, the process proceeds to the step S62.

In the step S60, the tracking information record is deleted, and the process proceeds to the step S61. Reference is made to the tracking information table stored in the HDD 204, and the tracking information record including color management identification information for identifying the target configuration which is the data to be deleted is deleted. In the step S61, the tracking information sharing record is deleted, and the process proceeds to the step S62. Reference is made to the tracking information sharing table stored in the HDD 204, and the tracking information sharing record including the color management identification information for identifying the target configuration which is the data to be deleted is deleted.

In the step S62, the sharing record is deleted, and the process proceeds to the step S63. Reference is made to the sharing table corresponding to the data to be deleted, and the sharing record corresponding to the data to be deleted is deleted. In the step S63, the data to be deleted is deleted, and the deleting process ends. The data that is to be deleted and is stored in the HDD 204 is deleted.

Figure 24:
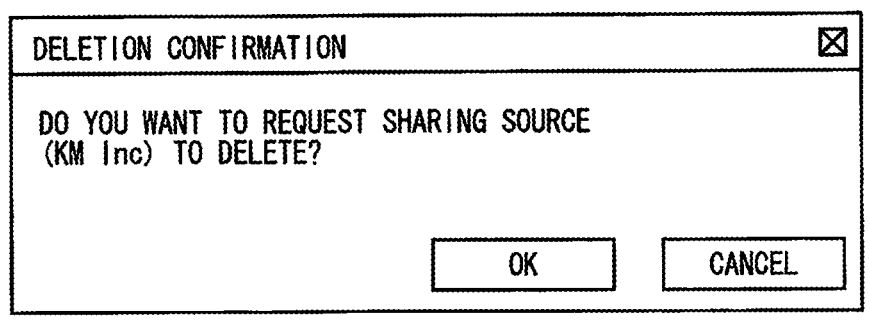
FIG. 24 is a diagram showing one example of a deletion confirmation screen.

FIG. 24 is a diagram showing one example of a deletion confirmation screen. The deletion confirmation screen includes user identification information for identifying a color expert and is a screen for confirming whether to request deletion. When the button in which the characters for "OK" are displayed is designated, the color expert is requested to permit deletion.

Figure 25:
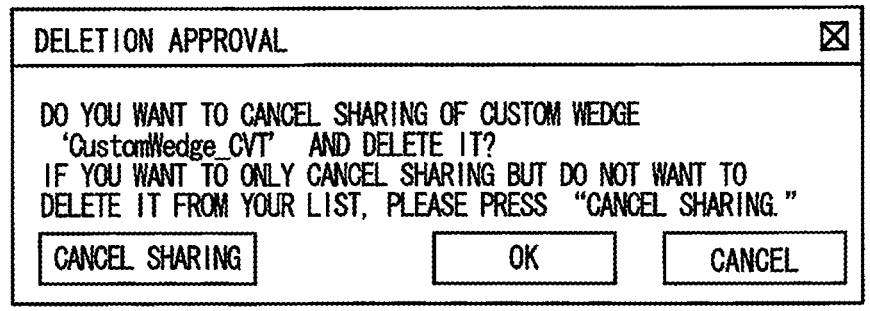
FIG. 25 is a diagram showing one example of a deletion approval screen.

FIG. 25 is a diagram showing one example of a deletion approval screen. The deletion approval screen is displayed in a case in which a color expert is logged in the system or after the color expert has logged into the system. Referring to FIG. 25, the deletion approval screen includes patch image identification information for identifying a patch image to be deleted, and is a screen in which the setting can be made such that the patch image is deleted or a sharing destination operator is not permitted to access the patch image.

Figure 26:
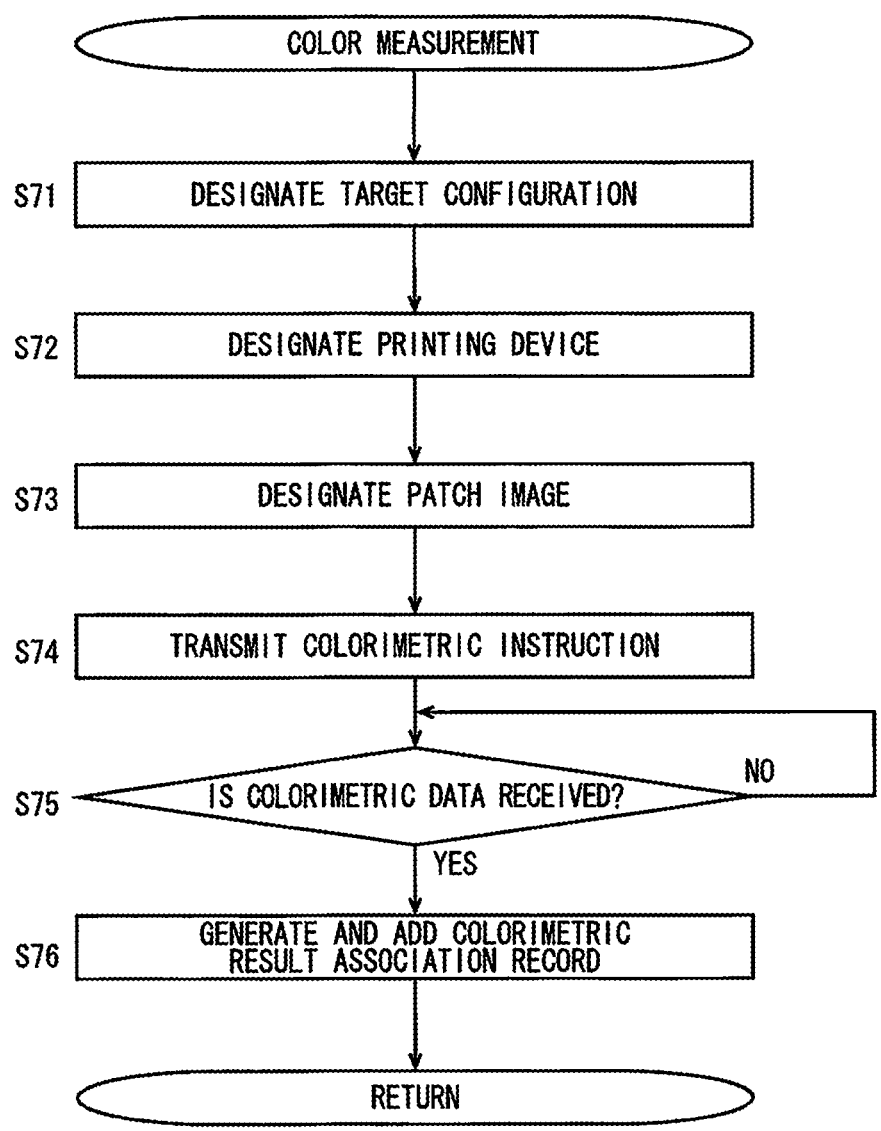
FIG. 26 is a flowchart showing one example of a flow of a colorimetric process.

FIG. 26 is a flowchart showing one example of a flow of a colorimetric process. The colorimetric process is a process executed by the CPU 201 when the CPU 201 included in the color management server 200 executes the color management program stored in the ROM 202, the HDD 204 or the CD-ROM 211. In a case in which a user who has logged into the system is a color expert, the CPU 201 executes the colorimetric process in accordance with an instruction input by the color expert.

Referring to FIG. 26, the CPU 201 accepts designation of a target configuration (step S71), and the process proceeds to the step S72. The target configuration designated by the color expert is specified.

In the step S72, designation of a printing device is accepted, and the process proceeds to the step S73. The printing device designated by the color expert is specified. In a case in which the tracking information is designated by the color expert, the target configuration and the printing device defined by the tracking information may be specified. In this case, the step S71 or the step S72 is unnecessary. In the step S73, designation of a patch image is accepted, and the process proceeds to the step S74. The patch image designated by the color expert is specified.

In the step S74, a colorimetric instruction is transmitted. A colorimetric instruction is transmitted to an operator who operates the printing device designated in the step S72. The colorimetric instruction includes information specifying each of the target configuration, the printing device and the patch image designated in the steps S71 to S73. In a case in which the operator who operates the printing device is logged into the system, the operator is notified of the colorimetric instruction. In a case in which the operator who operates the printing device is not logged into the system, the operator may be notified of the colorimetric instruction at a point in time at which the operator logs in. Alternatively, in a case in which the address of the operator is predetermined, the colorimetric instruction may be transmitted to the address.

The operator who is notified of the colorimetric instruction performs colorimetric work in accordance with the colorimetric instruction. Specifically, the operator causes the printing device specified by the colorimetric instruction to print the patch image specified by the colorimetric instruction. The printing device causes a colorimeter included in the printing device to measure the colors of the patch image printed on a recording medium such as a paper, and transmits colorimetric data output by the colorimeter to the color management server 200.

In the next step S75, the process waits until the colorimetric data transmitted from the printing device is received (NO in the step S75). When the colorimetric data is received (YES in the step S75), the process proceeds to the step S76. In the step S76, a colorimetric result association record is generated, and the color management process ends. The colorimetric result association record in which the tracking information, the patch image and the colorimetric data are associated with one another is generated and added to the colorimetric result association table stored in the HDD 204.

The colorimetric result association record in the format shown in FIG. 9 is generated.

FIG. 27 is a diagram showing one example of a colorimetric instruction screen. Referring to FIG. 27, in the colorimetric instruction screen, a target configuration setting area, an allowable range setting area and a device setting area are arranged in this order from the left.

The target configuration setting area includes an item for a target configuration, an item for a basic setting and an item for a measurement condition. In the item for a target configuration, color management identification information for identifying a target configuration is set. The item for a basic setting includes an item for wedge selection and an item for a target profile. In the item for wedge selection, patch image identification information for identifying patch image data corresponding to a patch image is set. In the item for a target profile, profile identification information for identifying profile information is set.

The item for a colorimetric condition includes an item for colorimeter selection, an item for an illumination condition, an item for a profiling chart and an item for a colorimetric count. In the item for colorimeter selection, colorimeter identification information for identifying a colorimeter used in color verification or profile creation is set. In the item for an illumination condition, identification information for identifying an illumination condition of a colorimeter is set. In the item for a profiling chart, identification information for identifying a chart to be used when at the time of profile creation is set. The chart is used to create a profile that is executed when a result of the color verification is not good. The item for a colorimetric count, the number of times the colors of the same patch image are measured at the time of color measurement is set. Reliability of a colorimetric result is improved when the number equal to or larger than 2 is selected. The profile information and the colorimetric condition may be set by designation of a target configuration.

In the allowable range setting area, an allowable value defined by standard or any allowable value defined by a user is set. In a case in which a colorimetric result exceeds the allowable value, it is determined to be not good. In the device setting area, a printing condition of a printing device, various profiles and an amount of ink or toner are set.

Modified Example

Figure 28:
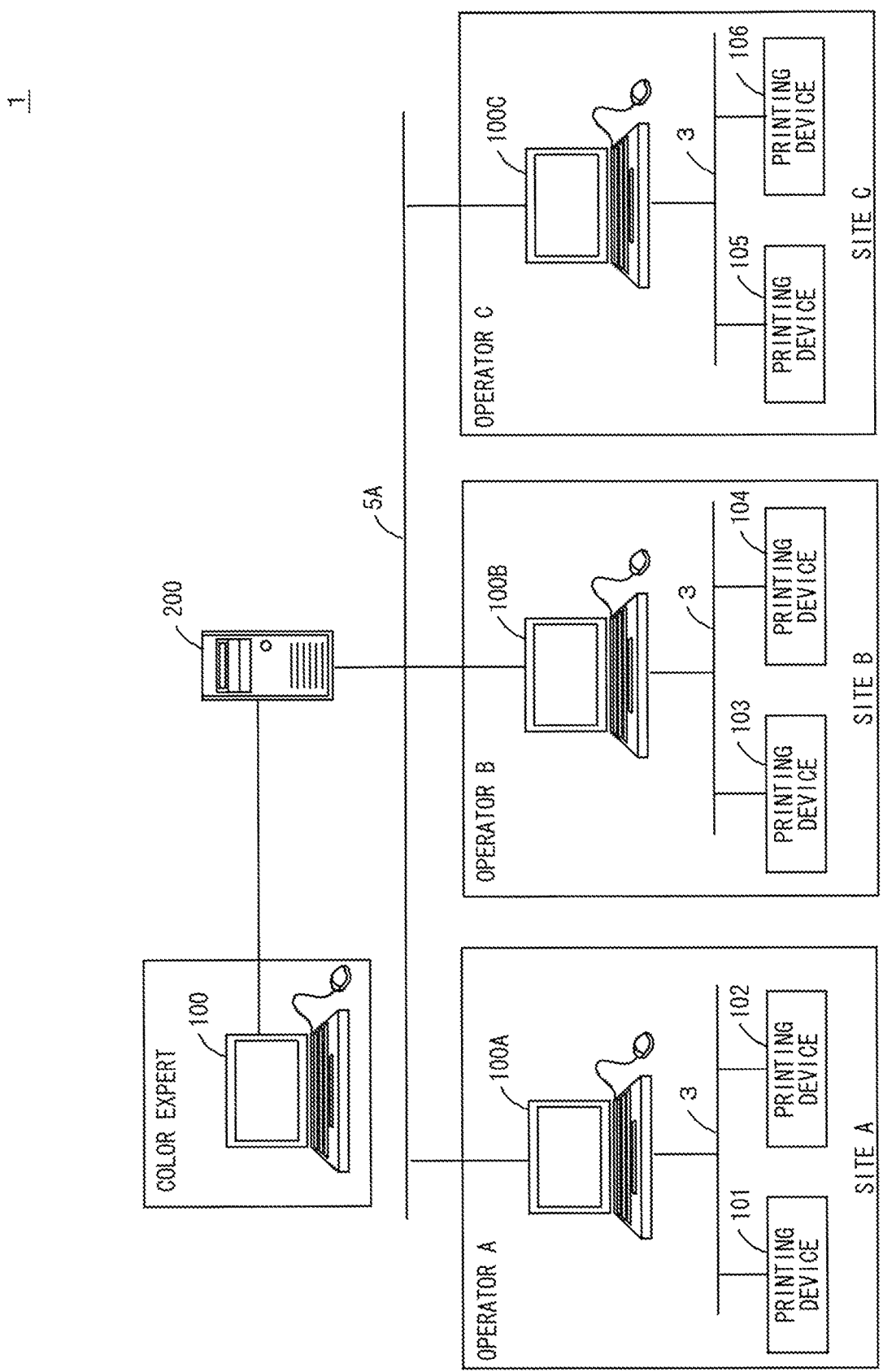
FIG. 28 is a diagram showing one example of the overview of a color management system in a modified example.

While the color management server 200 is connected to the network 5 which is the Internet, by way of example, in the above-mentioned embodiment, the color management server 200 and the terminal devices 100, 100A to 100C may be connected to the same local area network 5A as shown in FIG. 28.

Figure 29:
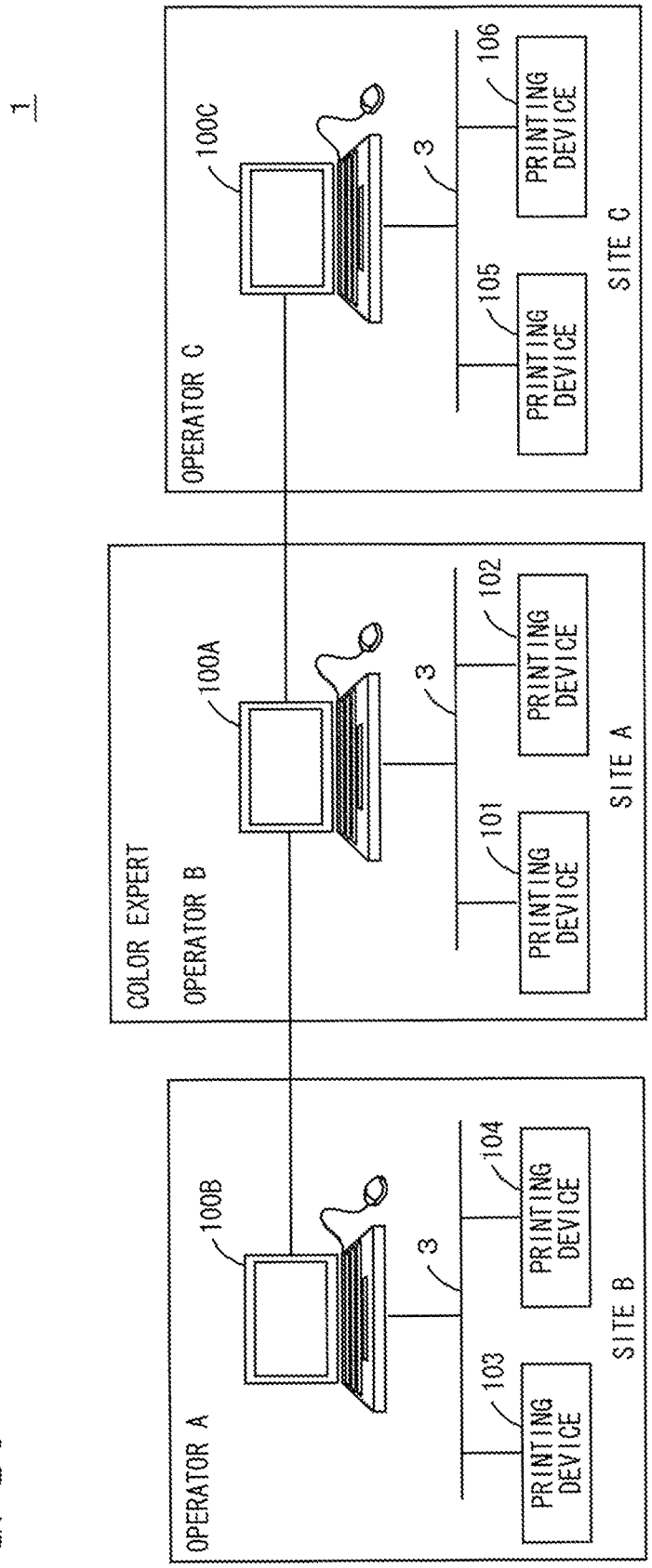
FIG. 29 is a second diagram showing one example of the overview of the color management system in the modified example.

Further, as shown in FIG. 29, the functions of the color management server 200 may be included in the terminal device 100A, and the terminal device 100B and the terminal device 100C may be directly connected to the terminal device 100A.

In the color management system 1 in the present embodiment as described above, the color management server 200 is an information processing apparatus accessible to a color expert who manages the colors of images printed by the printing devices 101 to 106 and the operators A to C each of which is capable of operating at least one of the printing devices 101 to 106. The color management server 200 registers a patch image to be printed by any of the printing devices 101 to 106 and/or a target configuration defining a condition for printing by a printing device in accordance with an instruction provided by a color expert, sets the patch image and/or the target configuration accessible to one or more operators, and permits access to the patch image and/or the target configuration set accessible to an operator who has made a request in response to a request from any of the operators A to C. Thus, the patch image and/or the target configuration corresponding to any of the printing devices 101 to 106 becomes accessible to an operator who can operate the printing device. Further, in a case in which the same patch image and/or the same target configuration is applied to a plurality of devices out of the plurality of printing devices 101 to 106, it is not necessary for the color expert to register the patch image and/or the target configuration for each of the operators A to C. Therefore, the operation is simplified.

The color management server 200 sets the patch image or the target configuration, accessed by any one of the color experts or the operators A to C, accessible to one or more operators designated by the color expert or the operator. Therefore, in a case in which the operator sets the patch image or the target configuration accessible to another operator, it is not necessary for the color expert to perform an operation of setting the patch image or the target configuration accessible to another operator. Thus, the operation is simplified. Because the patch image and/or the target configuration is shared among the operators A to C without an operation performed by the color expert, a burden on the color expert can be reduced.

The color management server 200 does not set a sharing destination operator be able to access a patch image or color management setting information unless a predetermined operation is accepted by one or more sharing destination operators designated by a color expert or an operator who accesses the patch image or the color management setting information. Therefore, the sharing destination operator can select a patch image and/or a target configuration to be accessible.

While deleting a patch image and/or a target configuration in accordance with an instruction provided by a color expert, the color management server 300 does not delete the patch image and/or the target configuration in accordance with an instruction provided by any one of the operators A to C. Thus, it is possible to prevent a patch image and/or a target configuration that may be used by a color expert from being deleted.

Further, in a case in which the color management server 200 associates any of a plurality of patch images with at least one of a plurality of target configurations, and an authorized operator out of the operators A to C is permitted to access the sharing setting information of the plurality of target configurations, the color management server 200 sets the patch image associated with the sharing setting information accessible to the authorized operator. Thus, it is not necessary to perform an operation of enabling the authorized operator to access the patch image associated with the target configuration.

Further, the color management server 200 associates any of a plurality of patch images with at least one of a plurality of target configurations and generates tracking information associating any of the plurality of target configurations with at least one of printing devices 101 to 106. In a case in which an authorized operator out of the operators A to C accesses the tracking information, if the target configuration associated with the printing device by the tracking information is associated with a patch image, the color management server 200 sets the target configuration and the patch image associated with the target configuration accessible to the authorized operator. Thus, it is not necessary to perform an operation of enabling the authorized operator to access the target configuration and the patch image.

Further, the color management server 200 shows a list of one or more patch images set accessible to each of the operator A to C and generates a patch image list screen which shows whether each of one or more patch images is accessible to another operator. This facilitates selection of a patch image to be shared with another operator by an operator who views the patch image list screen.

Further, when any of the operators A to C prints a patch image in accordance with a target configuration using at least any one printing device operable by the operator, the color management server 200 acquires a colorimetric result obtained by measurement of colors of the patch image printed on a recording medium and associates the colorimetric result with the printing device which has obtained the colorimetric result, the target configuration and the patch image. This facilitates viewing of the printing device, the target configuration and the patch image corresponding to the colorimetric result.

Although embodiments of the present invention have been described and illustrated in detail, the disclosed embodiments are made for purpose of illustration and example only and not limitation. The scope of the present invention should be interpreted by terms of the appended claims.

What is claimed is:

1. An information processing apparatus accessible to a color expert who manages colors of an image to be printed in a plurality of printing devices and a plurality of operators each of which is capable of operating at least one printing device out of the plurality of printing devices, comprising:
   a hardware processor, the hardware processor:
      registering a patch image to be printed by any of a plurality of printing devices and/or a color management setting information piece defining a condition for printing by the printing device in accordance with an instruction provided by the color expert;
      setting a patch image and/or the color management setting information piece accessible to one or more operators, who are designated by the color expert or the operator and access the patch image or the color management setting information piece; and
      in response to a request from any of the plurality of operators, permitting access to the patch image and/or the color management setting information piece set accessible to the operator who has made the request;
      wherein the hardware processor, unless a predetermined operation is not accepted by one or more sharing destination operators, who are designated by the color expert or the operator and access the patch image or the color management setting information piece, does not set the sharing destination operator able to access the patch image or the color management setting information piece.

2. The information processing apparatus according to claim 1, wherein
   the hardware processor is configured to delete the patch image and/or the color management setting information piece in accordance with an instruction provided by the color expert, and does not delete the patch image and/or the color management setting information piece in accordance with an instruction provided by any of the plurality of operators.

3. The information processing apparatus according to claim 1, wherein
   the hardware processor associates any of a plurality of patch images with at least one of a plurality of color management setting information pieces, and
   in a case in which an authorized operator out of the plurality of operators is permitted to access sharing setting information out of the plurality of color management setting information pieces, sets the patch image associated with the sharing setting information accessible to the authorized operator.

4. The information processing apparatus according to claim 1, wherein
   the hardware processor associates any of a plurality of patch images with at least one of a plurality of color management setting information pieces,
   generates tracking information that associates any of the plurality of color management setting information pieces with at least one of the plurality of printing devices,
   in a case in which an authorized operator out of the plurality of operators is permitted to access tracking information, when the color management setting information piece associated with the printing device by the tracking information is associated with the patch image, sets the color management setting information piece and the patch image associated with the color management setting information piece accessible to the authorized operator.

5. The information processing apparatus according to claim 1, wherein
   the hardware processor generates a list screen showing a list of the one or more patch images respectively set accessible to the plurality of operators, and
   the list screen includes a symbol representing whether the one or more patch images are accessible to the other operators.

6. The information processing apparatus according to claim 1, wherein
   the hardware processor,
   in a case in which any of the plurality of operators causes any of one or more printing devices operable by the operator to print an image of the patch image in accordance with the color management setting information piece, acquires a colorimetric result obtained by measurement of colors of a printed matter, and
   associates the colorimetric result with the printing device that has obtained the colorimetric result, the color management setting information piece and the patch image.

7. A color management method performed in an information processing apparatus accessible to a color expert who manages colors of an image to be printed in a plurality of printing devices and a plurality of operators each of which is capable of operating at least one printing device out of the plurality of printing devices, including:
   a registering step of registering a patch image to be printed by any of a plurality of printing devices and/or a color management setting information piece defining a condition for printing by the printing device in accordance with an instruction provided by the color expert;
   a sharing setting step of setting a patch image and/or the color management setting information piece accessible to one or more operators, who are designated by the color expert or the operator and access the patch image or the color management setting information piece,
   wherein the sharing setting step, unless a predetermined operation is not accepted by one or more sharing destination operators, who are designated by the color expert or the operator and access the patch image or the color management setting information piece, includes not setting a sharing destination operator able to access the patch image or the color management setting information piece; and an access controlling step of, in response to a request from any of the plurality of operators, permitting access to the patch image and/or the color management setting information piece set accessible to the operator who has made the request.

8. The color management method according to claim 7, further including a deleting step of deleting the patch image and/or the color management setting information piece in accordance with an instruction provided by the color expert, wherein a deleting step includes not deleting the patch image and/or the color management setting information piece in accordance with an instruction provided by any of the plurality of operators.

9. The color management method according to claim 7, further including an associating step of associating any of a plurality of patch images with at least one of a plurality of color management setting information pieces, wherein the sharing setting step, in a case in which an authorized operator out of the plurality of operators is permitted to access sharing setting information out of the plurality of color management setting information pieces, includes setting the patch image associated with the sharing setting information accessible to the authorized operator.

10. The color management method according to claim 7, further including:

an associating step of associating any of a plurality of patch images with at least one of a plurality of color management setting information pieces; and a generating step of generating tracking information that associates any of the plurality of color management setting information pieces with at least one of the plurality of printing devices, wherein the sharing setting step, in a case in which an authorized operator out of the plurality of operators is permitted to access tracking information, when the color management setting information piece associated with the printing device by the tracking information is associated with the patch image, includes setting the color management setting information piece and the patch image associated with the color management setting information piece accessible to the authorized operator.

11. The color management method according to claim 7, further including a screen generating step of generating a list screen showing a list of the one or more patch images respectively set accessible to the plurality of operators, wherein the list screen includes a symbol representing whether the one or more patch images are accessible to the other operators.

12. The color management method according to claim 7, further including:

a colorimetric result acquiring step, in a case in which any of the plurality of operators causes any of one or more printing devices operable by the operator to print an image of the patch image in accordance with the color management setting information piece, of acquiring a colorimetric result obtained by measurement of colors of a printed matter; and a result associating step of associating the colorimetric result with the printing device that has obtained the colorimetric result, the color management setting information piece and the patch image.

13. A non-transitory computer-readable recording medium encoded with a color management program executed by a computer that controls an information processing apparatus accessible to a color expert who manages colors of an image to be printed in a plurality of printing devices and a plurality of operators each of which is capable of operating at least one printing device out of the plurality of printing devices, causing the computer to perform:

a registering step of registering a patch image to be printed by any of a plurality of printing devices and/or a color management setting information piece defining a condition for printing by the printing device in accordance with an instruction provided by the color expert;

a sharing setting step of setting a patch image and/or the color management setting information piece accessible to one or more operators, who are designated by the color expert or the operator and access the patch image or the color management setting information piece, wherein the sharing setting step, unless a predetermined operation is not accepted by one or more sharing destination operators, who are designated by the color expert or the operator and access the patch image or the color management setting information piece, includes not setting a sharing destination operator able to access the patch image or the color management setting information piece; and an access controlling step of, in response to a request from any of the plurality of operators, permitting access to the patch image and/or the color management setting information piece set accessible to the operator who has made the request.

* * * * *